US012795251B2

(12) United States Patent
Foxman

(10) Patent No.: US 12,795,251 B2
(45) Date of Patent: Nov. 10, 2026

(54) MULTI-ORIENTATION PHOTO CAPTURE INTERFACE AND CAMERA SYSTEM

(71) Applicant: CAMALOT LLC, Encino, CA (US)

(72) Inventor: Ted Foxman, Encino, CA (US)

(73) Assignee: CAMALOT LLC, Encino (CA)

( * ) Notice: Subject to any disclaimer, the term of this patent is extended or adjusted under 35 U.S.C. 154(b) by 0 days.

(21) Appl. No.: 19/651,556

(22) Filed: Apr. 17, 2026

(65) Prior Publication Data

US 2026/0247043 A1 Aug. 20, 2026

Related U.S. Application Data

(60) Provisional application No. 63/876,843, filed on Sep. 5, 2025, provisional application No. 64/025,425, filed on Apr. 1, 2026.

(51) Int. Cl.

| | |
|---|---|
| ***H04N 23/951*** | (2023.01) |
| ***H04N 23/62*** | (2023.01) |
| ***H04N 23/63*** | (2023.01) |
| ***H04N 23/69*** | (2023.01) |
| ***H04N 23/88*** | (2023.01) |
| ***H04N 23/90*** | (2023.01) |

(52) U.S. Cl.

CPC ........... *H04N 23/951* (2023.01); *H04N 23/62* (2023.01); *H04N 23/632* (2023.01); *H04N 23/69* (2023.01); *H04N 23/88* (2023.01); *H04N 23/90* (2023.01)

(58) Field of Classification Search

CPC .... H04N 23/951; H04N 23/62; H04N 23/632; H04N 23/69; H04N 23/88; H04N 23/90; H04N 23/63; H04N 23/631

See application file for complete search history.

(56) References Cited

U.S. PATENT DOCUMENTS

| | | | | |
|---|---|---|---|---|
| 2022/0201224 | A1* | 6/2022 | Siu | H04N 23/45 |
| 2024/0089613 | A1* | 3/2024 | Siu | H04N 23/45 |
| 2025/0088733 | A1* | 3/2025 | Petty | H04N 23/63 |
| 2026/0129300 | A1* | 5/2026 | Yao | H04N 23/69 |

OTHER PUBLICATIONS

6X Studio. (Apr. 2026). 2Camera Dual Recorder Camera (Version 1.3.5) [Mobile App]. App Store. Retrieved Apr. 20, 2026 from https://apps.apple.com/us/app/2camera-dual-recorder-camera/id1584095090. 1 page.

(Continued)

*Primary Examiner* — Kelly L Jerabek

(74) *Attorney, Agent, or Firm* — Mintz Levin Cohn Ferris Glovsky and Popeo, P.C

(57) ABSTRACT

Systems and methods for a multi-orientation photo capture interface and camera system. The system includes a first lens having a standard viewing angle, a second lens having a wide viewing angle, an interactable display. The processor is configured to display a first image feed from the first lens in real time in a first region in real time at the interactable display, the first region having a portrait orientation. The processor is further configured to display a second image feed from the second lens in real time in a second region at the interactable display, the second lens having a landscape orientation. The first image feed and the second image feed are displayed simultaneously to each other at the interactable display.

30 Claims, 16 Drawing Sheets

(56) References Cited

OTHER PUBLICATIONS

Bending Spoons Operations S.p.A. (Mar. 2025). DoubleTake—Multicam video (Version 3.1.2) [Mobile App]. App Store. Retrieved Apr. 20, 2026 from https://apps.apple.com/us/app/doubletake-multicam-video/id1478041592. 1 page.
Camalot, LLC (Apr. 2026). Double View—Dual Recording (Version 3.0.7) [Mobile App]. App Store. Retrieved Apr. 20, 2026 from https://apps.apple.com/us/app/double-view-dual-recording/id6759210720. 1 page.
DDJR Productions LLC. (Apr. 2026). DualShot Recorder App (Version 2.3) [Mobile App]. App Store. Retrieved Apr. 20, 2026 from https://apps.apple.com/us/app/dualshot-recorder/id6761159805. 1 page.
Downey Jr, D. [@derrickdowneyjr]. (Mar. 28, 2026). I released my app last night and it's now the #1 Paid App on the Apple App Store! [Post]. Instagram. https://www.instagram.com/p/DWdH1rIFXDo/. Retrieved Apr. 20, 2026. 1 page.
DualShot Recorder Pro. (Apr. 2026). OneTake: Dual Camera Recorder (Version 2.5.) [Mobile App]. App Store. Retrieved Apr. 20, 2026 from https://apps.apple.com/us/app/onetake-dual-camera-recorder/id6761379940. 1 page.
DualTake Cam. (2026). DualTake Cam—Record Portrait & Landscape at the Same Time [Mobile Appl]. DualTake Cam. Retrieved Apr. 20, 2026 from https://www.dualtakecam.com/. 1 page.
Moha. (Apr. 2026). Camera DualShot (Version 1.0.2) [Mobile App]. App Store. Retrieved Apr. 20, 2026 from https://apps.apple.com/om/app/camera-dualshot/id6761372088. 1 page.
Sakanapps. (Jul. 2024). TwinViewer (Version 12.3) [Mobile App]. App Store. Retrieved Apr. 20, 2026 from https://apps.apple.com/us/app/twinviewer/id531595249. 1 page.
Sonic. Inc. (Apr. 2026). DualShot—Recorder Camera (Version 1.1) [Mobile App]. App Store. Retrieved Apr. 20, 2026 from https://apps.apple.com/us/app/dualshot-recorder-camera/id6761551078. 1 page.
Split Screen. (Mar. 2026). Split Screen—Dual Window (Version 1.4) [Mobile App]. App Store. Retrieved Apr. 20, 2026 from https://apps.apple.com/lv/app/split-screen-dual-window/id1525132136. 1 page.
Tavethiya, K. (Jan. 2025). Front & Back Camera Recording (Version 1.4) [Mobile App]. App Store. Retrieved Apr. 20, 2026 from https://apps.apple.com/us/app/front-back-camera-recording/id6444156934. 1 page.
Ukani, S. (Nov. 2025). Parallel App ~ Dual Accounts (Version 1.3) [Mobile App]. App Store. Retrieved Apr. 20, 2026 from https://apps.apple.com/us/app/parallel-app-dual-accounts/id6471808799. 1 page.
Vigo Global Co., Ltd. (Jan. 2026). Dual Cam Front & Back (Version 2.0) [Mobile App]. App Store. Retrieved Apr. 20, 2026 from https://apps.apple.com/us/app/dual-cam-front-back/id6757098667. 1 page.

* cited by examiner

MULTI-ORIENTATION PHOTO CAPTURE INTERFACE AND CAMERA SYSTEM

CROSS-REFERENCE TO RELATED APPLICATION

This application claims priority to U.S. Provisional Application No. 64/025,425 filed on Apr. 1, 2026, and titled "MULTI-ORIENTATION PHOTO CAPTURE INTERFACE AND CAMERA SYSTEM," and U.S. Provisional Application No. 63/876,843, filed on Sep. 5, 2025, and titled "MULTI-ORIENTATION PHOTO CAPTURE INTERFACE AND CAMERA SYSTEM," the entirety of each of which is incorporated by reference herein.

BACKGROUND

Technical Field

The invention relates to mobile imaging technology, and more specifically to systems and methods for capturing, saving, and organizing multiple camera perspectives on a mobile device.

Description of Related Art

Existing mobile camera applications allow users to view image or video feeds from only one perspective at a time. Examples of perspectives may include vertical formats, landscape formats, and wide angle formats. If a user wishes to obtain both perspectives of the same scene, the user must take multiple separate captures, which can lead to inconsistencies between shots, added effort, and missed moments.

Additionally, conventional gallery applications store all images and videos in a single collection, with no clear distinction between media captured from different lenses or from different applications. This makes it difficult to locate wide-angle perspective captures versus standard-angle captures, or to identify both versions of a scene taken with multiple lenses. Users therefore face inefficiencies in both capturing and organizing media.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting.

DETAILED DESCRIPTION OF CERTAIN EMBODIMENTS

Figure 1A:
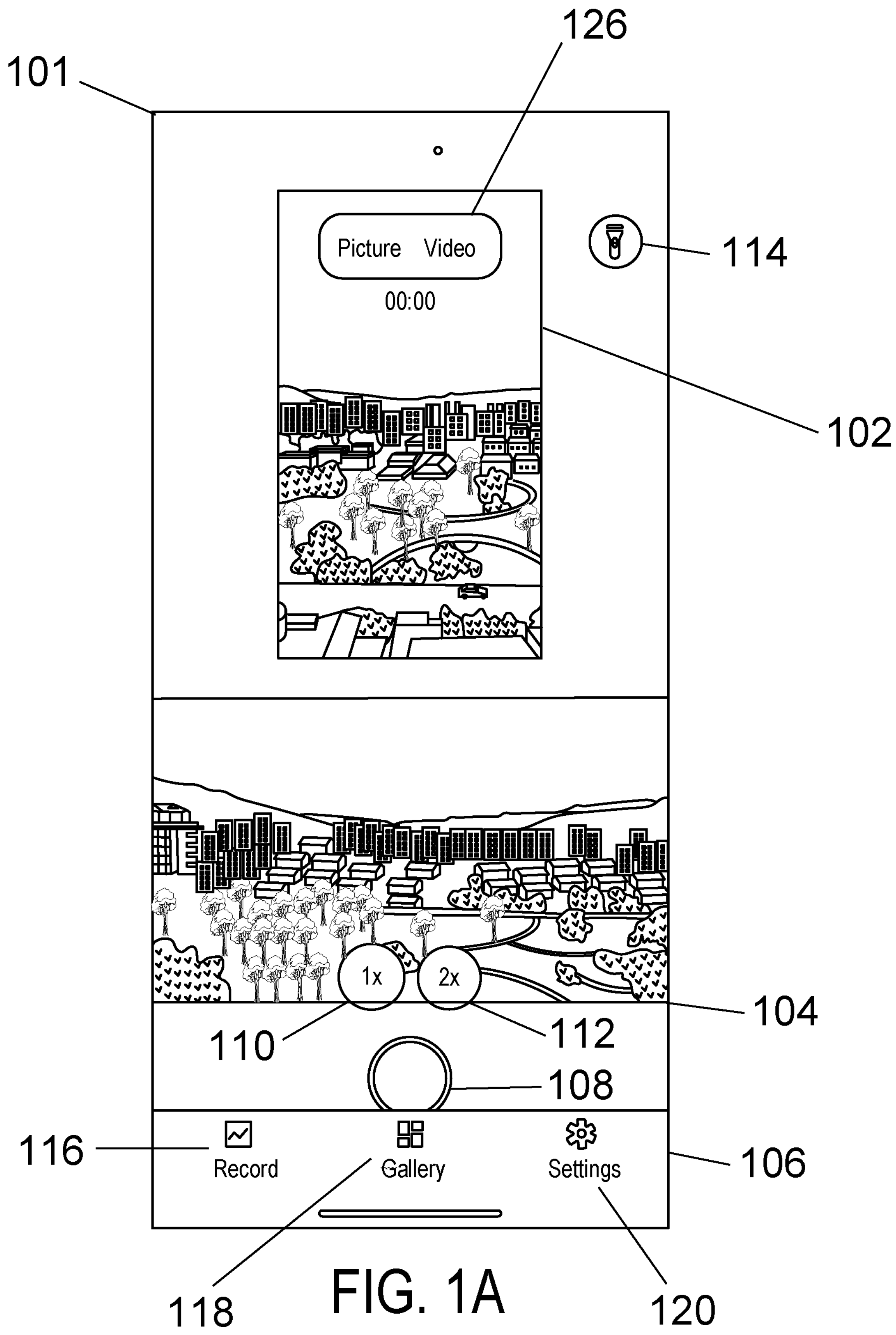
FIG. 1A depicts a front-view illustration of the mobile device display screen depicting the primary user interface of the multi-orientation photo capture application shown in an active camera recording state.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or apparatus may be implemented or a method may be practiced using any number of the aspects set forth herein. In addition, such a system or apparatus may be implemented or such a method may be practiced using other structure, functionality, or structure and functionality in addition to or other than one or more of the aspects set forth herein.

Similarly, methods disclosed herein may be performed by one or more computer processors configured to execute instructions retrieved from a computer-readable storage medium. A computer-readable storage medium stores information, such as data or instructions, for some interval of time, such that the information can be read by a computer during that interval of time. Examples of computer-readable storage media are memory, such as random-access memory (RAM), and storage, such as hard drives, optical discs, and flash memory.

Unless otherwise defined, each technical or scientific term used herein has the same meaning as commonly understood by one of ordinary skill in the art to which this disclosure belongs. In accordance with the claims that follow and the disclosure provided herein, the following terms are defined with the following meanings, unless explicitly stated otherwise.

As used herein, the term "comprising" or "comprises" is intended to mean that the devices, systems, and methods include the recited elements, and may additionally include any other elements. "Consisting essentially of shall mean that the devices, systems, and methods include the recited elements and exclude other elements of essential significance to the combination for the stated purpose. Thus, a device or method consisting essentially of the elements as defined herein would not exclude other materials or steps that do not materially affect the basic and novel characteristic(s) of the claimed invention. "Consisting of" shall mean that the devices, systems, and methods include the recited elements and exclude anything more than a trivial or inconsequential element or step. Embodiments defined by each of these transitional terms are within the scope of this disclosure.

The problems described in the background are addressed by providing:

- A dual live-view interface that simultaneously displays two different perspectives: vertical format perspective and a landscape format perspective;
- A simultaneous capture mechanism that records and saves both standard and wide-angle images or videos in parallel, eliminating the need for multiple takes;
- A dedicated in-app gallery that exclusively displays content captured by the application, with filtering by image type (standard, wide-angle, video) and grouping of corresponding captures; and
- Cross-compatibility that ensures captured media is also stored in the device's native gallery, making it accessible to the default camera app and third-party applications.

This problem-solution approach results in a more efficient, consistent, and user-friendly method of capturing and managing multi-perspective media on mobile devices.

A method and system for providing a dual-view camera interface on a mobile device, wherein a first display region presents a vertical format view using a primary lens, and a second display region simultaneously presents a landscape format view derived from an auxiliary lens. The landscape format view is generated by capturing image data from an ultra-wide camera sensor and processing the data by cropping and scaling to produce a view that maintains the visual formatting of an expanded field of view. The system thereby enables a user to concurrently monitor a vertical format view and an augmented landscape format view on the same display, enhancing situational awareness and providing an immersive multi-perspective recording and preview experience.

The system further provides a capture mechanism enabling simultaneous recording of multiple perspectives. Upon initiation of a single capture command, the mobile device concurrently stores both a vertical format perspective for a photo or video from a primary lens and a landscape format perspective for a photo or video from an auxiliary ultra-wide lens. In certain implementations, the wide-angle content is generated by processing image data from the ultra-wide sensor to crop, scale, or otherwise transform the feed to produce a distinct wide-perspective recording. Both outputs are stored in parallel as independent media files, thereby eliminating the need for the user to repeat a scene or action in order to separately obtain vertical format and landscape format versions of the same moment. This dual-capture functionality increases efficiency, consistency, and user convenience in content creation.

The system further comprises a dedicated media gallery configured to display only the images and videos captured within the application. The dedicated media gallery is selectively filtered to present captured content according to image type or perspective, such as standard field-of-view images, wide-angle images, or video recordings. In certain embodiments, the gallery provides a combined view that lists corresponding landscape format and vertical format captures together as grouped entries, thereby enabling the user to readily identify and access both versions of a given scene. By restricting the gallery to media generated solely by the application, the system ensures a streamlined, purpose-built browsing environment that avoids clutter from externally generated content and enhances the user's ability to organize and retrieve dual-perspective recordings. References to "image" or "images" includes both still images and moving images (e.g., videos and recordings). "Capture" or "capturing" refers to the act of recording an image, sound, or other information using a computer or mobile device.

In addition to providing a dedicated gallery for content management, the system is further configured to store each captured image or video in a manner that makes the file accessible through the device's native media storage. In some embodiments, the dual-perspective captures (standard and wide-angle) are automatically written to both the application-specific gallery and the mobile operating system's default photo or video library. This enables the captured content to be retrieved, viewed, or edited using the native camera application or any third-party application with access to the device's standard media repository, while still preserving the organizational advantages of the dedicated in-app gallery.

FIG. 1A depicts a front-view illustration of the mobile device display screen depicting the primary user interface of the multi-orientation photo capture application shown in an active camera recording state. The interface 101 presents the complete dual-perspective live camera preview environment alongside the application's persistent bottom navigation bar, illustrating the simultaneous display of two distinct camera feeds, the capture mode selection controls, the zoom control interface, the shutter control, the flash toggle, and the primary navigation structure of the application. FIG. 1A represents the end user's principal interaction screen.

The interface 101 is organized into three primary vertical sections: an upper display region 102 occupying approximately the top half of the screen that presents the first camera feed in a portrait-orientation format; a lower display region 104 occupying the lower half of the screen above the navigation bar that presents the second camera feed in a landscape-orientation format; and a persistent bottom navigation bar 106 providing access to the application's three primary functional sections.

The upper display region 102 presents a live video feed from the device's primary standard wide-angle camera lens, rendered in a portrait-orientation (vertical, approximately 9:16 aspect ratio) display format. The portrait orientation may have an aspect ratio indicative that the height of the (e.g., live video feed) is greater than the width of the image. In some embodiments, the upper display region 102 (and the corresponding image feed) may have an aspect ratio different from the aspect ratio of the lower display region 104.

The lower display region 104 presents a live video feed from the device's secondary ultra-wide-angle camera lens, rendered in a landscape-orientation (horizontal, approximately 16:9 aspect ratio) display format. The camera feed fills the lower display region 104 edge-to-edge within that region, with the same scene depicted in a wider field of view relative to the upper display region 102, illustrating the distinct perspective captured by the ultra-wide lens. The lower region's landscape orientation and broader field of view differs from the upper region's portrait orientation, giving the user simultaneous visual access to both the standard-perspective and wide-perspective interpretations of the same scene. The landscape orientation may have an aspect ratio indicative that the width of the image (e.g., live video feed) is greater than the height of the image. The lower display region 104 (and the corresponding image feed) may have an aspect ratio different from the aspect ratio of the upper display region 102.

The two display regions (e.g., upper portrait and lower landscape) are rendered in a vertically stacked, non-overlapping configuration within the device display such that the complete device display area above the navigation bar is occupied by the two camera feeds presented as a contiguous dual-preview outputs. The display regions can be rendered in any image preview feed.

In some embodiments, a zoom control interface (110, 112) may be overlaid at the lower-center portion of the second camera feed region. The zoom control interface (110, 112) may comprise two zoom preset selector buttons, labeled "1×" and "2×" respectively. The two zoom preset buttons are positioned adjacently in a horizontal arrangement centered within the lower display region 104. The active zoom level may be visually distinguished from the inactive preset through a difference in size, opacity, or visual weight between the two button elements.

In certain embodiments, the zoom control interface (110, 112) for the lower display region 104 operates independently of the zoom control for the upper display region 102 to enable the user to set distinct zoom levels for each camera view without affecting the other. The 1× preset corresponds to the native field of view, and the 2× preset corresponds to a doubled zoom factor applied to that feed. In additional embodiments, the zoom control interface (110, 112) supports a continuous zoom slider (such as an interactive zoom pill with logarithmic scaling) and additional preset values (such as 0.5× and 5×), enabling fine-grained zoom adjustment across a broader range for each camera view independently. The logarithmic scaling of the zoom controls ensures that equal physical finger-movement distances correspond to equal zoom ratio increments, matching the behavior of native platform camera applications.

The zoom control interface (110, 112) may be overlap with the first display region, the second display region, or overlap both display regions simultaneously. In certain embodiments, a single zoom control may affect both camera feeds proportionally. In alternative embodiments, independent zoom controls may be provided for each display region, allowing the user to adjust the magnification of each camera feed independently.

In certain embodiments, a pinch-to-zoom gesture applied directly to either display region provides an alternative zoom control mechanism, with the zoom factor applied independently to the camera feed in the region where the gesture is performed. Haptic feedback may be provided when the zoom level crosses preset thresholds or reaches minimum or maximum zoom range limits.

The zoom control interface (110, 112) may comprise one or more of: discrete preset buttons (e.g., 1× and 2× magnification levels) positioned within a display region; a continuous slider mechanism with anchor marks at preset magnification levels (e.g., 0.5×, 1×, 2×) supporting drag-based continuous adjustment; a pinch-to-zoom gesture applied directly to either display region providing intuitive zoom control without dedicated interface elements; or a combination thereof. The relationship between user input position on the slider and the resulting zoom factor may follow a logarithmic mapping function providing perceptually uniform zoom control. The zoom adjustment may be executed through a hardware-level ramp function that smoothly transitions the camera sensor zoom factor at a configurable rate (e.g., approximately 80 units per second at a 44 Hz update frequency). The 1× preset may correspond to the native field of view of the respective camera lens. The 2× preset may correspond to a doubled zoom level. In additional embodiments, the zoom control interface (110, 112) supports values beyond the preset magnification levels through continuous slider adjustment.

Below the lower display region 104 and above the bottom navigation bar 106, a large circular shutter button 108 is presented. The shutter button 108 is rendered as a prominent circular element, visually distinguished by its size and placement to indicate its primary action role within the interface 101. Tapping the shutter button 108 in picture mode initiates a simultaneous dual-perspective still photograph capture event, triggering both the portrait-orientation and landscape-orientation capture outputs in a single user action. Tapping the shutter button 108 in video mode initiates simultaneous dual-perspective video recording; tapping again while recording is active stops both recording streams simultaneously, completing the dual-perspective video capture event.

At the bottom of the display, a persistent bottom navigation bar 106 provides access to the three primary sections of the application. The navigation bar contains three navigation items, each comprising an icon and a text label, arranged at equal horizontal intervals across the full width of the bar.

Record 116 corresponds to the active camera recording screen depicted in FIG. 1A. When the record 116 navigation item is active, the dual-view camera preview and capture controls described above are presented to the user.

Gallery 118 may navigate the user to the application's dedicated in-application media gallery, which presents the dual-perspective media content captured within the application. The gallery 118 provides filtering by content type (e.g., pictures, portrait-orientation pictures, landscape-orientation pictures, and video recordings) and supports a grouped presentation mode in which the corresponding portrait-orientation and/or landscape-orientation captures of the same scene are displayed as paired entries. The gallery 118 supports a multi-selection mode activated by long-press or drag gesture, enabling batch operations such as sharing and deletion. A fullscreen viewer accessible from the gallery provides swipe-based navigation between media items, pinch-to-zoom for photographs, and inline video playback with transport controls. When leaving the gallery screen, an exit confirmation dialog may be presented to prevent accidental navigation away from an active selection session.

Settings button 120 is the navigation item, which may be represented by a gear icon above the label "Settings." Alternatively, the settings button may be located anywhere in the screen. Settings button 120 navigates the user to the application's settings screen, which serves as the central management interface for account and application configuration options. Settings button 120 provides access to subscription management, account actions (including data privacy management and account deletion flows), and a section highlighting planned upcoming features. Settings button 120 may use a state-driven UI model that transitions between the main settings view and specific action subpages in response to user selections.

Settings may include the ability to disable one of the two recording streams so that only a single camera view is captured in a given session; user-selectable video frame rate control (such as 24 fps and 30 fps options) for the video capture feature; AI-assisted search of images within the application gallery; cloud backup of captured media; video transcription of recorded content; post-capture addition or removal of objects within captured photos and videos through an integrated editing interface; and addition of text captions to captured media content.

The bottom navigation bar 106 may enable one-tap navigation between the record 116, gallery 118, and settings 120 screens without requiring a hierarchical back-navigation sequence. The currently active section is visually indicated within the navigation bar. The application uses an edge-to-edge display layout for an immersive full-screen experience, with system UI elements managed appropriately when entering and leaving the camera recording screen.

A capture mode selector 126 may allow the user to select between two modes: "picture" and "video." The two labels may be presented side by side within the user interface, with the currently active capture mode visually distinguished from the inactive mode. In some embodiments, the user may switch between still photograph capture mode and video recording mode with a single tap. The capture mode selector 126 may be positioned within the first camera feed region to minimize obstruction of the live preview content while remaining immediately accessible to the user.

This capture mode selector 126 functions as the toggle between the two primary capture modalities of the system. In Picture mode, activating the shutter control triggers the simultaneous dual-perspective still photograph capture pipeline, producing two independent image files (e.g., one portrait-orientation and one landscape-orientation) in a single capture event. In video mode, activating the shutter control initiates simultaneous dual-perspective video recording through two independent media writer instances operating in parallel, producing two independent video files of matching duration.

Figure 1B:
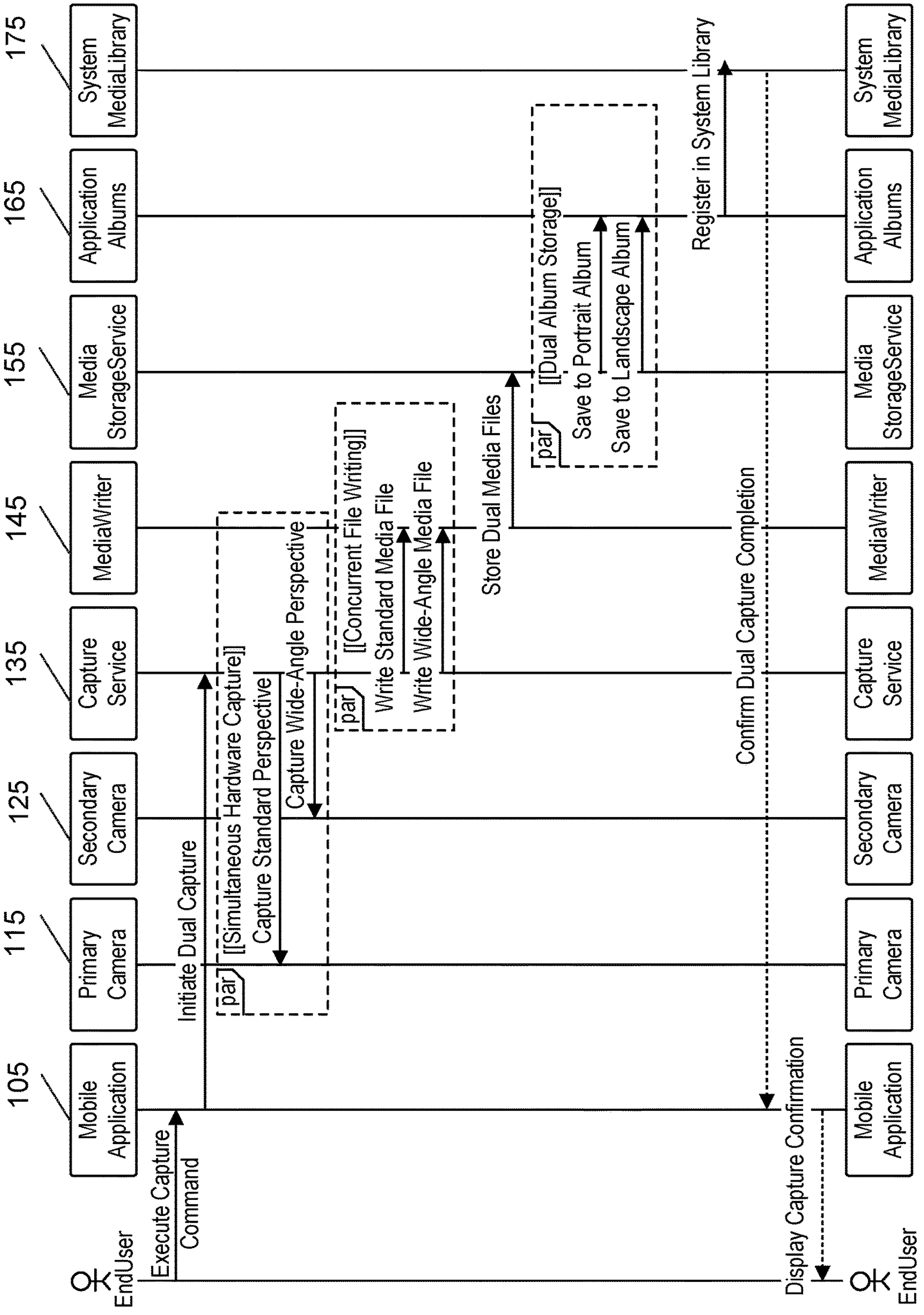
FIG. 1B depicts a sequence diagram illustrating the end-to-end data flow and interaction sequence during a simultaneous dual-perspective media capture operation.

FIG. 1B depicts a sequence diagram illustrating the end-to-end data flow and interaction sequence during a simultaneous dual-perspective media capture operation. The sequence diagram may trace a single user-initiated capture command as it propagates through software and hardware components, culminating in the storage and confirmation of two independently saved media files. The sequence may apply concurrency to hardware capture, file writing, and album storage wherever possible to minimize total capture latency and temporally synchronize the two perspectives.

The end user may initiate a capture event by issuing a single capture command through the mobile application 105 UI. This represents a single user action (e.g., pressing the shutter button) that triggers the entire downstream dual-capture pipeline. The end user may be a human operator interacting with the mobile application's capture interface. The front-end application layer responsible for receiving user input and providing UI feedback.

The mobile application 105 may forward the capture request to the capture service 135 via an "Initiate Dual Capture" message. Capture service 135 may orchestrate all subsequent camera and file operations. Capture service 135 may manage and coordinate concurrent capture operations across both camera hardware components.

Capture service 135 triggers a parallel execution block (denoted par [[Simultaneous Hardware Capture]]) in which both camera subsystems (e.g., primary camera 115 and secondary camera 125) are engaged concurrently. A "Capture Standard Perspective" command is dispatched to primary camera 115. Primary camera 115 may be a standard-angle lens subsystem configured to capture a portrait/vertical-orientation perspective. Primary camera 115 may be configured to capture image or video data in the portrait/vertical orientation using the standard-angle lens. A "Capture Wide-Angle Perspective" command is dispatched to secondary camera 125. The secondary camera 125 may be an ultra-wide-angle lens subsystem configured to capture a landscape/wide-angle perspective. Secondary camera 125 may be configured to simultaneously capture image or video data in the landscape orientation using the ultra-wide-angle lens. The par designation instructs that both hardware capture operations are initiated at the same instant, ensuring temporal consistency between the two resulting media files. This eliminates the frame-timing discrepancies inherent in sequential capture approaches. In some embodiments, the primary camera 115 and the secondary camera 125 may be oriented in a substantially similar direction. In some embodiments, the primary camera 115 and the secondary camera 125 are capable of capturing the same subject and/or the same scene as a result of being oriented in the same direction. In some embodiments, the primary camera 115 and the secondary camera 125 are at a same side of a mobile device.

Upon completion of both hardware captures, the capture service 135 delivers the raw media data to the media writer 145. Media writer 145 may be a file-writing service responsible for encoding and persisting captured image or video data as independent media files on the device. Media writer 145 may initiate a second parallel block (e.g., par [[Concurrent File Writing]]) in which "write standard media file" and "write wide-angle media file" commands are commenced concurrently. The portrait-orientation capture from primary camera 115 is encoded and written as an independent media file in a "write standard media file" command. The landscape-orientation capture from secondary camera 125 is independently encoded and written as a separate media file in a "write wide-angle media file" command. Both file-writing operations may be performed concurrently and produce fully independent output files, preserving each perspective as a discrete, non-embedded media artifact.

Once both files are written, media writer 145 forwards them to media storage service 155 via a "Store Dual Media Files" message. Media storage service 155 may be a platform-level media storage abstraction that handles writing files to the device's native operating system media repository. The media storage service 155 may act as the bridge between application-level file I/O and the device's storage subsystem, managing the physical persistence of both files. Each perspective may be stored as a fully standalone media file rather than as a combined or embedded artifact, enabling independent editing, sharing, or deletion of either perspective.

Media storage service 155 may route both files to the application albums 165 component through a third parallel block (par [[Dual Album Storage]]) for saving the portrait album and the landscape album simultaneously. Application albums 165 may be an application-specific gallery subsystem for organizing and storing captured content in dedicated, purpose-built album structures (e.g., portrait album, landscape album). Using application albums 165, the standard-perspective media file may be saved to a dedicated portrait album within the application's internal gallery. Similarly, the wide-angle media file may be saved to a dedicated landscape album within the application's internal gallery using application albums 165. The dual-album architecture may enable the application's gallery to present both perspectives in an organized, type-specific manner, supporting filtered browsing (e.g., vertical pictures vs. wide pictures).

Following application-level storage, application albums 165 component issues a "Register in System Library" call to system media library 175. System media library 175 may operate the system's native media library (e.g., iOS photos framework or android media store), which registers media files for universal cross-application accessibility. The "Register in System Library" call may confirm that both captured files are written to the operating system's native photo/video library, making them accessible to the default camera application, third-party apps, and any other platform service with permission to access the device's media repository. Each captured file may be stored both within the application's dedicated gallery (e.g., application albums 165) and within the device's native system media library 175, satisfying the requirements of both in-app organization and cross-application accessibility without requiring the user to perform any additional action.

Mobile application 105 may present a visual confirmation to the end user, signaling that both perspectives have been successfully captured, written, organized, and registered.

Additionally and/or alternatively, the mobile application 105 may perform a simultaneous dual-perspective media capture operation using a single lens. Instead of capturing images from both lenses, a single image may be captured using a single lens and then duplicated for producing two separate images. The duplicated image may be a cropped and/or scaled version of the originally captured image. The cropping and/or scaling of the duplicated image may result in the duplicated image having an aspect ratio different than the aspect ratio of the originally captured image. The original image and the cropped/scaled duplicated image are both saved as independent media files. For example, the original image may be saved to a first file and the cropped/scaled duplicated image may be saved to a second file.

For a single lens operation, capture service 135 may trigger a parallel execution block (denoted par [[Simultaneous Hardware Capture]]) in which a single subsystem (e.g., primary camera 115 or secondary camera 125) is engaged. A "Capture Standard Perspective" command is dispatched to either the primary camera 115 or the secondary camera 125. Upon completion of the hardware capture, capture service 135 delivers the raw media data to the media writer 145. Media writer 145 may be a file-writing service responsible for encoding and persisting captured image or video data as independent media files on the device. Media writer 145 may initiate a second parallel block (e.g., par [[Concurrent File Writing]]) in which "write standard media file" and "write wide-angle media file" commands are commenced concurrently. The originally captured image the single lens (e.g., primary camera 115) is encoded and written as an independent media file in a "write standard media file" command. The cropped/scaled duplicated image from the single lens (e.g., primary camera 115) is independently encoded and written as a separate media file in a "write wide-angle media file" command. In some embodiments, the originally captured image may be from a lens having a standard viewing angle having an aspect ratio corresponding to a vertical orientation and the cropped/scaled duplicated image may be derived from the originally captured image to have an aspect ratio corresponding to a landscape orientation. In some embodiments, the originally captured image may be from a lens having a wide viewing angle having an aspect ratio corresponding to a landscape orientation and the cropped/scaled duplicated image may be derived from the originally captured image to have an aspect ratio corresponding to a vertical orientation. Both file-writing operations may be performed concurrently and produce fully independent output files, preserving each perspective as a discrete, non-embedded media artifact.

Once both files are written as two separate files, the remaining logic flow for FIG. 1 and its corresponding description is substantially similar for the single lens embodiment as the dual lens embodiment. Duplicating the single image captured from the single lens means that the originally captured media and the duplicated image capture the same or substantially similar subject matter.

A plurality of aspect ratio configurations for the captured media may be captured and stored. For photo capture, the primary camera 115 may produce images at a native sensor resolution of approximately 3840 by 3072 pixels (approximately 5:4 aspect ratio) for the standard wide-angle lens and approximately 3780 by 3024 pixels (approximately 5:4 aspect ratio) for the ultra-wide-angle lens, preserving the full native sensor resolution without resampling. For video capture, the system may record the first image feed at a resolution of 1080 by 1920 pixels in a portrait orientation (9:16 aspect ratio) and the second image feed at a resolution of 1920 by 1080 pixels in a landscape orientation (16:9 aspect ratio). The preview display regions may render at device-dependent resolutions matching the physical display pixel density. The system may support output configurations optimized for specific end applications, including: Instagram and TikTok format at 1080 by 1920 pixels (9:16 portrait optimized); YouTube format at 1920 by 1080 pixels (16:9 landscape optimized); original format preserving the native capture resolution without additional cropping or resizing; standard photo format at a 4:3 aspect ratio; square social media format at a 1:1 aspect ratio; cinematic ultrawide format at a 21:9 aspect ratio; and classic photo format at a 3:2 aspect ratio. Video may be encoded using HEVC (H.265) at approximately 12 Mbps with AAC audio at 48 KHz/256 kbps, or AVC (H.264) when HEVC is unavailable. Photos may use HEIF (HEIC) at full sensor resolution with JPEG fallback.

| Type | Exemplary Aspects | Exemplary Resolutions | Notes |
|---|---|---|---|
| Wide photo | 5:4 | 3840 × 3072 | Native sensor crop |
| UW photo | 5:4 | 3780 × 3024 | Native sensor crop |
| Wide video | 9:16 | 1080 × 1920 | Portrait |
| UW video | 16:9 | 1920 × 1080 | Landscape |
| Preview (top) | 9:16 | Device-dependent | Portrait orientation |
| Preview (bottom) | 16:9 | Device-dependent | Landscape orientation |
| Export: IG/TikTok | 9:16 | 1080 × 1920 | Portrait optimized |
| Export: YouTube | 16:9 | 1920 × 1080 | Landscape optimized |

-continued

| Type | Exemplary Aspects | Exemplary Resolutions | Notes |
|---|---|---|---|
| Export: Original | Native | Varies | No crop/resize |
| 4:3 | 4:3 | Varies | Standard photo |
| 1:1 | 1:1 | Varies | Square/social |
| 21:9 | 21:9 | Varies | Cinematic ultrawide |
| 3:2 | 3:2 | Varies | Classic photo |

Figure 2:
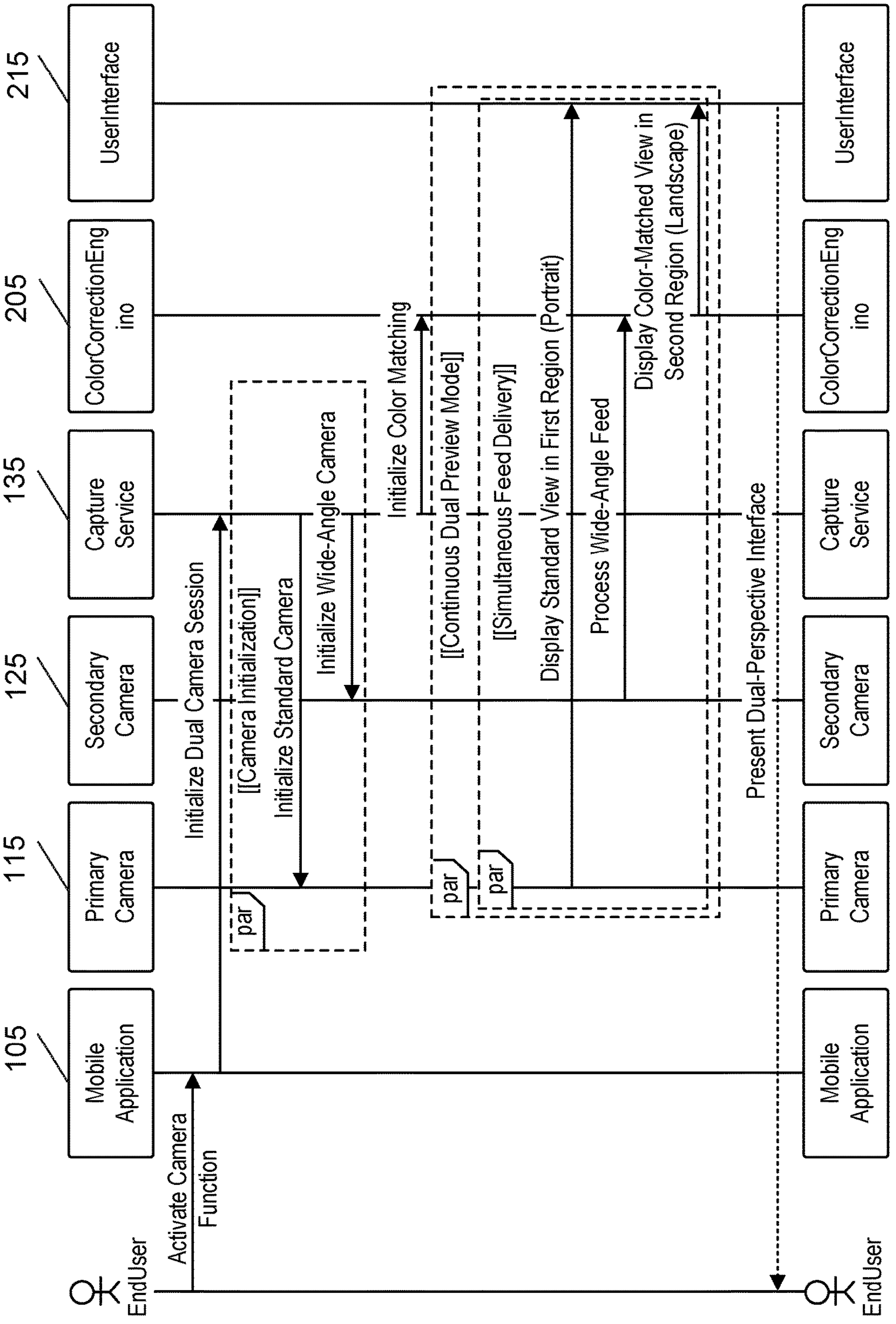
FIG. 2 depicts a sequence diagram illustrating the initialization and continuous operation of the dual-view camera interface.

FIG. 2 depicts a sequence diagram illustrating the initialization and continuous operation of the dual-view camera interface. The sequence diagram may trace the sequence of interactions from the moment the user activates the camera function through the establishment of a fully operational, real-time dual-perspective live preview displayed simultaneously on a single user interface. The use of a par block for camera initialization may eliminate any asymmetric delay between the standard and wide-angle feeds.

The end user may initiate the sequence by activating the camera function within the mobile application 105 by, for example, navigating to the record screen. A single user action may trigger the full dual-camera initialization pipeline. The end user may be a human operator who activates the camera function and is the ultimate recipient of the rendered dual-perspective live preview interface. The mobile application 105 may be a primary application layer that receives the user's activation input, orchestrates the initialization sequence, and delivers the final assembled dual-perspective interface back to the user.

Mobile application 105 may forward the activation request to the capture service 135 via an "Initialize Dual Camera Session" message. Capture service 135 may coordinate initializing both camera hardware components concurrently and managing the continuous dual-feed data pipeline. Capture service 135 may be configured to control of all downstream hardware and software initialization operations required to establish a synchronized dual-camera live preview environment.

Capture service 135 may trigger a parallel execution block (par [[Camera Initialization]]) in which both camera hardware subsystems (e.g., a primary camera and a secondary camera) are initialized concurrently. Capture service 135 may issue a command to the primary camera 115. Primary camera 115 may include a standard-angle lens hardware subsystem configured to capture the live portrait-orientation video feed used in the first display region. Capture service 135 may bring the standard-angle lens into an active, streaming-ready state with the appropriate capture parameters (resolution, frame rate, orientation, exposure). Simultaneously, capture service 135 may issue a command to the secondary camera 125 for activating the ultra-wide-angle lens into a streaming-ready state configured for wide-angle capture. The concurrent initialization of both camera subsystems may reduce the total setup latency and prepare both feeds for streaming at the same time. In some embodiments, the primary camera 115 and the secondary camera 125 are oriented in the same direction for capturing substantially similar subject matter.

Upon completion of both camera initializations, capture service 135 may issue an "Initialize Color Matching" command to the color correction engine 205. The color correction engine 205 may be an image processing subsystem configured to match the color, exposure, and tonal characteristics of the wide-angle feed to produce a visually coherent landscape-orientation view consistent with the standard feed. The "Initialize Color Matching" command may be applied continuously to the wide-angle feed during live preview operation. Additionally, the color correction engine 205 may calibrate its algorithms to match the tonal, white balance, and exposure characteristics of the wide-angle output to those of the standard camera feed for visual consistency between the two simultaneously displayed perspectives. Color correction engine 205 may account for the inherent optical and sensor differences between the standard and ultra-wide lenses.

Capture service 135 may enable a continuous dual preview mode. In FIG. 2, the continuous dual preview mode may be denoted by the outer parallel block par [[Continuous Dual Preview Mode]]. Within this preview mode, a nested parallel block (par [[Simultaneous Feed Delivery]]) may control the real-time delivery and rendering of both live feeds. The nested par [[Simultaneous Feed Delivery]] block within the outer par [[Continuous Dual Preview Mode]] loop may synchronize the display operations to provide a seamless, real-time dual-perspective experience. In some embodiments, the nested par structure within the continuous preview loop may render both the unprocessed standard feed and the processed wide-angle feed to their respective display regions simultaneously on each frame cycle with no perceptible latency difference between the two views.

For example, the live video feed from the primary camera 115 is delivered directly to the user interface 215 (e.g., continuous dual preview mode), which then may be rendered continuously within the first display region (e.g., simultaneous feed delivery). The first display region in the user interface 215 may be formatted in a portrait/vertical orientation. This region in the user interface 215 may present the standard-angle perspective in its native aspect ratio without additional processing. Concurrently, the live video feed from the secondary camera 125 may be routed to the color correction engine 205 for real-time processing. Color correction engine 205 may be configured to crop, scale, and color-match the ultra-wide sensor data with the standard angle perspective to produce a visually formatted landscape-orientation output (e.g., continuous dual preview mode). Color correction engine 205 may be configured to crop and scale transform the ultra-wide field of view into a specific wide-perspective visual format that simulates a landscape or panoramic perspective. Additionally, color correction engine 205 may adjust the tones and colors to match the standard feed displayed in the first region. The color correction engine 205 may output the color-matched wide-angle output delivered to the user interface 215 and rendered continuously within the second display region (e.g., simultaneous feed delivery). The second display region may be formatted in a landscape/horizontal orientation and display the processed wide-angle perspective in real time alongside the standard view.

Color correction engine 205 may operate as a discrete, always-on processing layer applied exclusively to the wide-angle feed during continuous preview mode. By initializing color matching as a separate step, color correction engine 205 may be configured to visually harmonize the landscape-orientation view with the portrait-orientation view from the moment the interface is presented to the user.

The user interface 215 may signal the mobile application 105 via a "Present Dual-Perspective Interface" message. The user interface 215 may be configured to display the two live camera feeds within their respective display regions on the device screen simultaneously. The mobile application 105 may be configured to present the fully assembled dual-perspective live preview to the end user for displaying both the portrait-orientation standard view and the landscape-orientation color-matched wide-angle view simultaneously within a single unified camera interface. That is, the two live feeds may be rendered in spatially distinct, non-overlapping regions within the same user interface (e.g., a first region formatted for portrait orientation (standard view) and a second region formatted for landscape orientation (processed wide-angle view)) to enable the user to simultaneously monitor both perspectives without toggling between camera modes or screens.

Additionally and/or alternatively, mobile application 105 may perform a simultaneous dual-perspective media capture operation using a single lens (instead of using two lenses). Instead of capturing images from both lenses, a single image may be captured using a single lens and then duplicated for producing two separate images. The duplicated image may be a cropped and/or scaled version of the originally captured image. The cropping and/or scaling of the duplicated image may result in the duplicated image having an aspect ratio different than the aspect ratio of the originally captured image. The original image and the cropped/scaled duplicated image are both used for the image preview feed. For example, the original image may be displayed in a first region of the user interface and the cropped/scaled duplicated image may be displayed in a second region of the user interface.

For a single lens operation, capture service 135 may coordinate the initialization of one hardware component (e.g., the primary lens 115 or secondary lens 125) and manage the continuous dual-feed data pipeline. Capture service 135 may initialize a single camera hardware subsystem (e.g., a primary camera 115 or secondary camera 125). Capture service 135 may bring the single lens into an active, streaming-ready state with the appropriate capture parameters (resolution, frame rate, orientation, exposure).

Upon completion of single camera initializations, capture service 135 may issue an "Initialize Color Matching" command to the color correction engine 205. The color correction engine 205 may be an image processing subsystem configured to match the color, exposure, and tonal characteristics of the captured media to produce a visually coherent landscape-orientation view consistent with the captured media of the single lens. In some embodiments, The color correction engine 205 may be an image processing subsystem configured to match the color, exposure, and tonal characteristics of the captured media to produce a visually coherent vertical-orientation view consistent with the captured media of the single lens. The "Initialize Color Matching" command may be applied continuously to a duplicated image of the original image captured using the single lens during live preview operation.

Capture service 135 may enable a continuous dual preview mode using the captured media from the single lens by duplicating the captured media. The duplicated media may be a cropped and/or scaled variation of the captured media having a different aspect ratio compared to the originally captured media. The originally captured media from the single lens may be a first preview feed and the cropped/scaled variation of the captured media may be a second preview feed. In FIG. 2, the continuous dual preview mode may be denoted by the outer parallel block par [[Continuous Dual Preview Mode]]. Within this preview mode, a nested parallel block (par [[Simultaneous Feed Delivery]]) may control the real-time delivery and rendering of both live feeds. The nested par [[Simultaneous Feed Delivery]] block within the outer par [[Continuous Dual Preview Mode]] loop may synchronize the display operations to provide a seamless, real-time dual-perspective experience. In some embodiments, the nested par structure within the continuous preview loop may render both the unprocessed standard feed and the processed wide-angle feed to their respective display regions simultaneously on each frame cycle with no perceptible latency difference between the two views.

For example, the originally captured media feed is delivered directly to the user interface 215 (e.g., continuous dual preview mode), which then may be rendered continuously within the first display region (e.g., simultaneous feed delivery). The first display region in the user interface 215 may be formatted in a portrait/vertical orientation. This region in the user interface 215 may present the standard-angle perspective in its native aspect ratio without additional processing. Concurrently, the cropped/scaled duplicated media may be routed to the color correction engine 205 for real-time processing. Color correction engine 205 may be configured to crop, scale, and color-match the cropped/scaled duplicated media to match with the standard angle perspective to produce a visually formatted landscape-orientation output (e.g., continuous dual preview mode). Color correction engine 205 may be configured to crop and scale transform the duplicated media into a specific wide-perspective visual format that simulates a landscape or panoramic perspective. Additionally, color correction engine 205 may adjust the tones and colors to match the originally captured media displayed in the first region. The color correction engine 205 may output the color-matched duplicated media to the user interface 215 and rendered continuously within the second display region (e.g., simultaneous feed delivery). The second display region may be formatted in a landscape/horizontal orientation and display the processed wide-angle perspective in real time alongside the standard view.

The user interface 215 may signal the mobile application 105 via a "Present Dual-Perspective Interface" message. The user interface 215 may be configured to display the two live camera feeds derived from a single lens within their respective display regions on the device screen simultaneously. The mobile application 105 may be configured to present the fully assembled dual-perspective live preview to the end user for displaying both the portrait-orientation standard view and the landscape-orientation color-matched wide-angle view simultaneously within a single unified camera interface. That is, the two live feeds may be rendered in spatially distinct, non-overlapping regions within the same user interface (e.g., a first region formatted for portrait orientation (standard view) and a second region formatted for landscape orientation (processed wide-angle view)) to enable the user to simultaneously monitor both perspectives without toggling between camera modes or screens. The first region and the second region may displayed at the same time. Duplicating the single image captured from the single lens means that the originally captured media and the duplicated image capture the same or substantially similar subject matter.

In some embodiments, the user interface may display three simultaneous camera feeds with different orientations or aspect ratios. In a three-lens mode, the mobile device may include a third lens (e.g., a telephoto lens, or a front-facing lens, in addition to the standard wide-angle and ultra-wide-angle rear lenses), and the processor may be configured to allow a user to select any two of the three (or more) available lenses for assignment to the display regions respectively. The system may support dynamic lens reassignment between capture sessions. Alternatively, the system may have more than three lenses. The system may support more than three lenses, such as four, five, six, seven lenses. The user may select any number of the lenses with each lens capable of producing a preview feed. Each preview feed from each of the lenses may have a respective display region at the interactable display (e.g., four display regions, five display regions). Options for capture modes and/or display modes include at least portrait, spatial, panoramic, panel, macro, telephoto, and aerial. The first region, second region, third region, and Nth region may have aspect ratios and resolutions that are all different and that match a capture mode, such as a portrait capture mode, a spatial capture mode, a panoramic capture mode, a panel capture mode, a macro capture mode, a telephoto capture mode, and an aerial capture mode.

Figure 3:
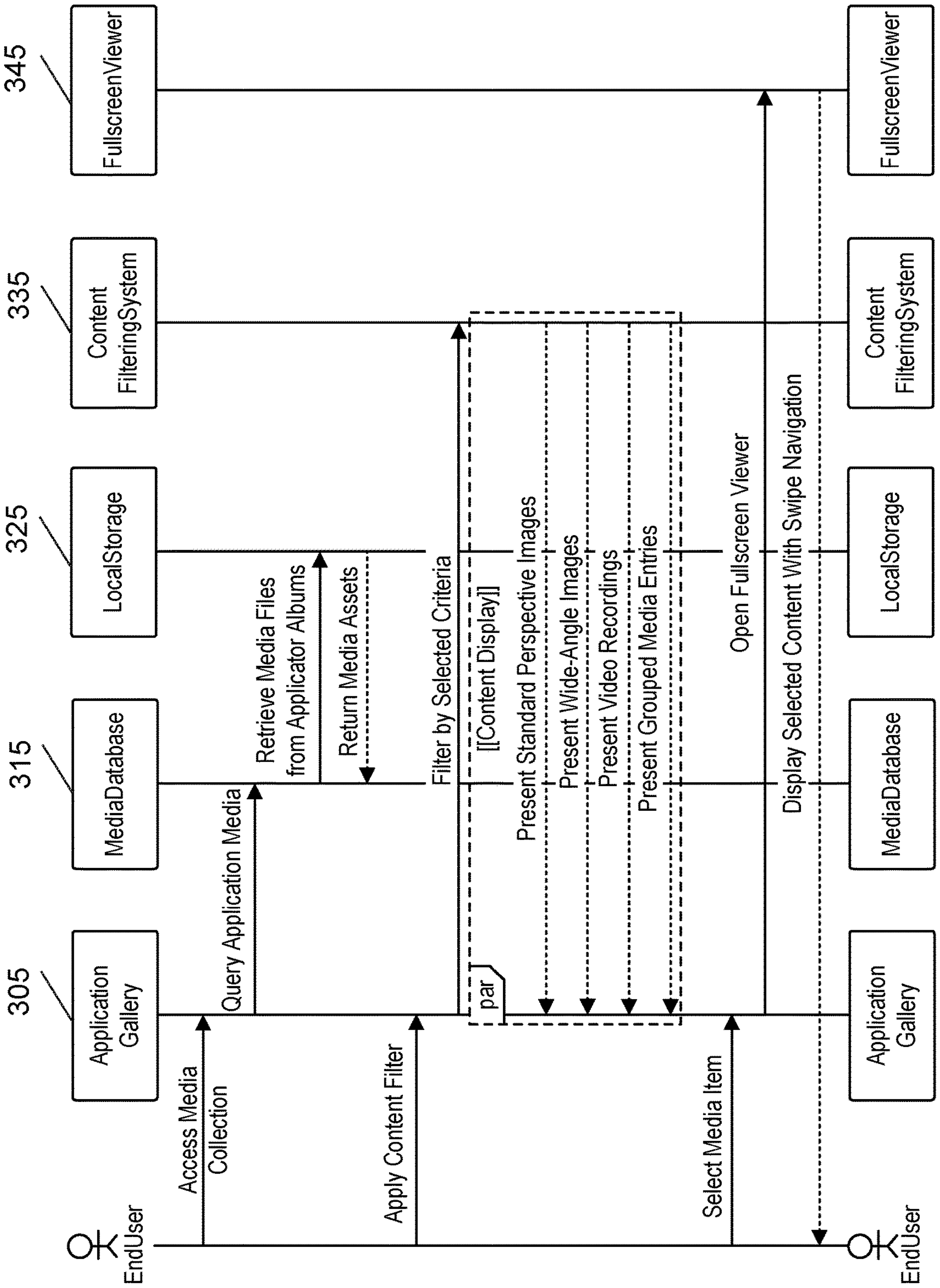
FIG. 3 depicts a sequence diagram illustrating the architecture and operational flow of the dedicated in-application media gallery

FIG. 3 depicts a sequence diagram illustrating the architecture and operational flow of the dedicated in-application media gallery. The sequence diagram may trace the interactions from the moment the user accesses the media collection through the retrieval, filtering, and presentation of dual-perspective content and culminate in fullscreen playback of a selected media item with swipe-based navigation. The gallery may be designed exclusively to surface media generated within the application, providing a purpose-built browsing environment that is organizationally distinct from the device's native photo library. The gallery's ability to present corresponding standard and wide-angle captures as grouped entries provides a unique organizational affordance that directly reflects the dual-capture architecture of the system. Users can identify and access both versions of any captured scene from a single gallery entry without manually cross-referencing separate albums The end user may initiate the gallery function within the application, triggering an "Access Media Collection" request to application gallery 303. Application gallery 303 may be configured to receive user interactions, coordinate data retrieval, apply filter commands, and compose the final filtered media view for display. The "Access Media Collection" request may open the dedicated in-app gallery environment. The dedicated in-app gallery may exclusively host media generated by the application and may not surface content from the device's broader native photo library.

Application gallery 303 may issue a "Query Application Media" request to media database 315. Media database 315 may be configured to maintain a structured index of all media assets captured within the application, including metadata such as media type, perspective orientation (standard vs. wide-angle), capture timestamp, and file path references. The "Query Application Media" request queries the full index of media assets captured and stored by the application, including their associated metadata (media type, orientation classification, file paths, capture timestamps, and grouping identifiers that link corresponding standard and wide-angle captures of the same scene).

In response to the database query, media database 315 may issue a "Retrieve Media Files from Application Albums" request to local storage 325. Local storage 325 may include an on-device file storage subsystem that physically houses the captured media files within the application's allocated storage space that is organized into application-specific album directories (e.g., portrait album, landscape album). Local storage 325 may access the application's dedicated album directories on the device file system and retrieve the physical media files corresponding to the indexed records.

Local storage 325 is configured to return the retrieved media assets to the media database 315. Media database 315 may be configured to consolidate return the complete set of media assets—including both standard-perspective and wide-angle-perspective files—to the application gallery 303. Application gallery 303 now holds the full unfiltered collection of application-generated media, ready for filtering and display.

The end user may apply a content filter via the application gallery 303 interface to select a specific content type for display. The gallery interface may support the following filter criteria: pictures, vertical pictures (e.g., displays only images captured in the standard portrait orientation by the primary camera 115), wide pictures (e.g., displays only images captured in the wide-angle landscape orientation by the secondary camera 215), vertical videos, wide videos, portrait pictures, landscape pictures, portrait videos, landscape videos, videos (e.g., displays only video recordings captured within the application). Upon selection of a filter, the application gallery 303 issues a "Filter by Selected Criteria" command to the content filtering system 335.

Content filtering system 335 may be configured to process the filter command against the full media asset collection to evaluate each asset's metadata against the selected criteria. Content filtering system 335 may be a sorting engine configured to filter criteria applied by the user and return only the subset of media assets matching the selected perspective type or media format. Content filtering system 335 may return only those assets that match the active filter and discard non-matching records from the result set.

Upon receiving the filtered result set, the application gallery 303 may enter a parallel content display block (par [[Content Display]]) that establishes how the filtered media collection is presented to the End User. Application gallery 303 may be capable of simultaneously presenting multiple content views depending on the active filter state. Content views include present standard perspective images (e.g., standard portrait-orientation images captured by the primary camera 115 are presented within the gallery grid as discrete thumbnail entries), present wide-angle images (e.g., wide-angle landscape-orientation images captured by the secondary camera 125 and processed by the color correction engine 205 are presented as discrete thumbnail entries), present video recordings (e.g., video recordings captured within the application are presented as thumbnail entries with playback indicators), present grouped media entries (e.g., corresponding standard-perspective and wide-angle captures of the same scene are presented as grouped entries within the gallery view, enabling the user to immediately identify and access both versions of a given moment as a paired set). Present grouped media entries may rely on capture-time identifiers to link the two simultaneously recorded files from each dual-capture event.

The par block structure enables concurrent presentation of all active content streams operate within application gallery 303 for a responsive and fluid display regardless of the size or composition of the filtered result set.

The end user may select a specific media item from the filtered gallery view, which results in the issuance of a "Select Media Item" event to the application gallery 303. Application gallery 303 identifies the selected asset and its position within the ordered result set to initialize fullscreen playback.

Application gallery 303 may issue an "Open Fullscreen Viewer" command to the fullscreen viewer 345. Fullscreen viewer 345 may be configured to render a selected image or video in an immersive, edge-to-edge display with swipe-based navigation between items, video playback controls, and deletion capability. Fullscreen viewer 345 may initialize with the selected item positioned as the active entry, with neighboring items in the filtered set preloaded to support immediate swipe navigation. Video playback controllers within the fullscreen viewer 345 may be initialized on demand and disposed when items leave the viewport, ensuring efficient use of device memory and processing resources across large media collections.

Fullscreen viewer 345 may render the selected media item in a fullscreen, immersive display and delivers the fully interactive "Display Selected Content With Swipe Navigation" experience to the End User. Fullscreen viewer 345 supports the following behaviors: swipe navigation (e.g., the user may swipe left or right to advance through adjacent items in the filtered media set), image rendering (e.g., still images are rendered at full resolution with aspect-ratio-preserving scaling), video playback (e.g., video items are rendered with a dedicated playback controller that includes a progress bar, play/pause toggle, and formatted duration display), deletion (e.g., the user may delete the currently displayed item via the device's native media deletion API). error feedback (e.g., non-disruptive notifications communicate success or failure states without interrupting the viewing experience).

Figure 4:
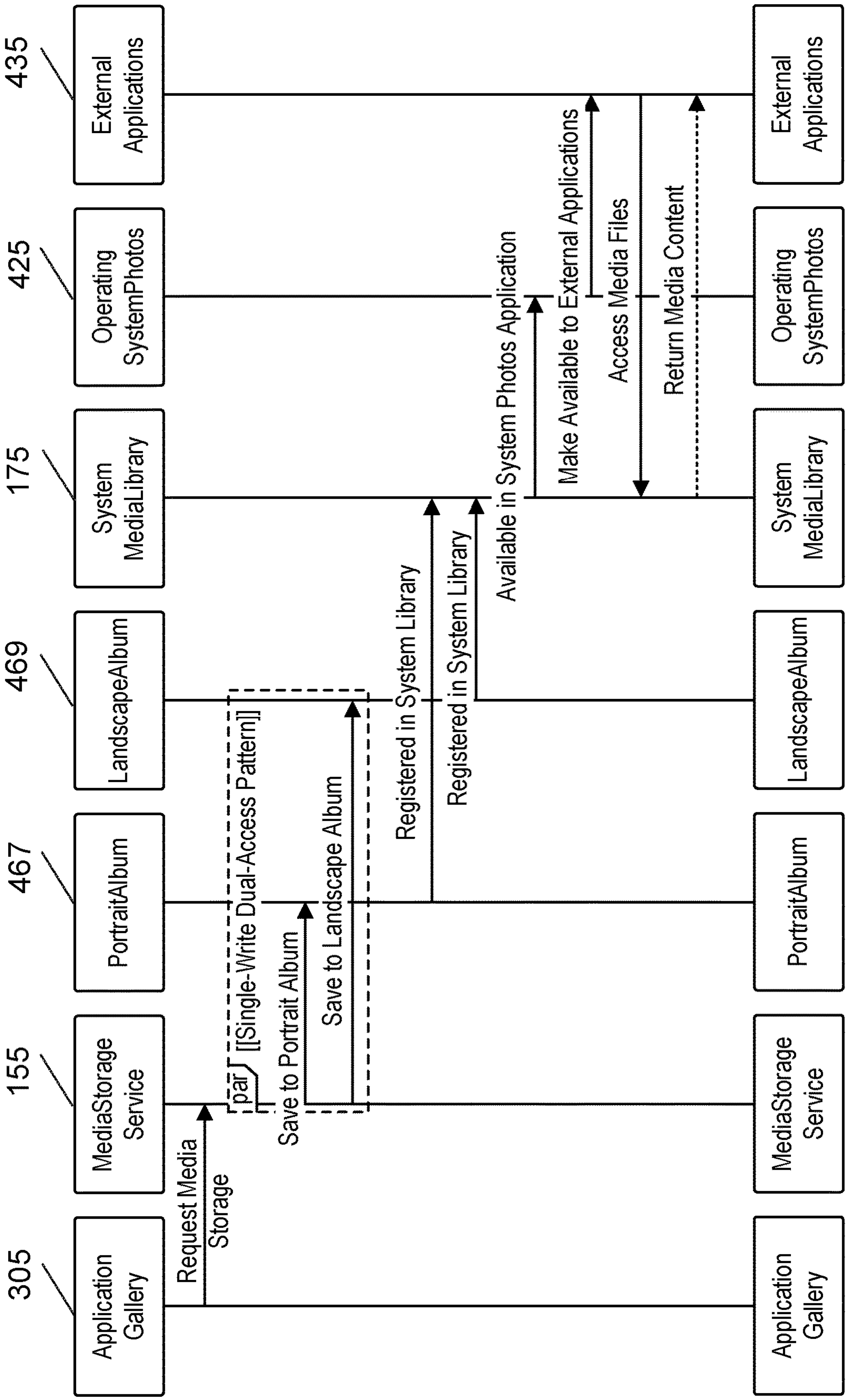
FIG. 4 depicts a sequence diagram illustrating the dual integration of captured media within the device's operating system media library

FIG. 4 depicts a sequence diagram illustrating the dual integration of captured media within the device's operating system media library. Using a "Single-Write Dual-Access Pattern," the dual-perspective media may be captured within the mobile application 105 and simultaneously push the dual perspective media to 1) application-specific album structures and 2) the device's operating system media library. The dual integration of captured media allows cross-application accessibility without requiring any additional user action.

Application gallery 305 may issue a "Request Media Storage" message to the media storage service 155. This message initiates the downstream dual-storage pipeline, signaling that one or more captured media files (including both a portrait-orientation standard-perspective file and a landscape-orientation wide-angle-perspective file) are ready to be dually stored and dually registered within the local storage 845.

Upon receiving this request, the media storage service 155 may enter a parallel execution block designated par [[Single-Write Dual-Access Pattern]], illustrated in FIG. 4 as a dashed-bordered concurrent execution region. This parallel execution block is configured to dispatch both media assets concurrently to their respective application-specific album structures. Dispatching both media assets concurrently pushes simultaneous write operations for both the portrait-orientation and landscape-orientation files. Simultaneous write operations minimizes the total storage latency and maintains temporal consistency between the two stored perspectives.

Within the parallel execution block, media storage service 155 may send a "Save to Portrait Album" message to the portrait album 467. Portrait album 467 may be an album structure dedicated to storing portrait-orientation (vertical format) media files generated by the primary camera subsystem. The "Save to Portrait Album" message directs the portrait-orientation media file to be written to the application's dedicated portrait album repository. Simultaneously, media storage service 155 may issue a "Save to Landscape Album" message to the landscape album 469. Landscape album 469 is an application-specific album structure dedicated to storing landscape-orientation (wide-angle format) media files generated by the secondary ultra-wide camera subsystem. The "Save to Landscape Album" message may direct the landscape-orientation wide-angle media file to be written to the application's dedicated landscape album repository. Both write operations may be initiated at the same moment to produce two fully independent media files representing a discrete perspective of the same captured scene that is stored within the application's organized internal gallery structure. Portrait album 467 may be a discrete, purpose-built repository within the application's internal gallery framework to maintain portrait-orientation captures separately from landscape-orientation content. Landscape album 469 may operate in parallel with the portrait album and may serve as the corresponding repository for the wide-angle perspective of each dual-perspective capture event.

Following the completion of the parallel write operations, both the portrait album 467 and the landscape album 469 independently issue "Registered in System Library" messages to the system media library 175. These registration messages notify the operating system's native media library that each captured file exists on the device file system and should be indexed and made accessible through the platform's universal media access layer. This step constitutes the "dual-access" dimension of the Single-Write Dual-Access Pattern: a single write operation per perspective, performed concurrently, results in each file being simultaneously accessible through both the application's dedicated internal gallery and the device's native system media library.

Upon receiving registration from both albums, the media storage service 175 issues an "Available in System Photos Application" message to the operating system photos 425 component. Operating system photos 425 may be the device's native system-level photo and video management application, which retains media files registered in the system media library 175. The "Available in System Photos Application" message may signal that the dual-perspective media files have been successfully indexed within the native media library and are now surfaced within the device's default system photo and video management application. Within the standard operating system interface, the end user may view, organize, and interact with the captured content without requiring any additional steps.

Operating system photos 425 component may subsequently issue a "Make Available to External Applications" message to external applications 435 to propagate the availability of the registered media files to all third-party applications and platform services with appropriate permissions. The "Make Available to External Applications" message may make dual-perspective media captured within the application universally discoverable and usable across the broader device ecosystem. External applications 435 may represent third-party applications and platform services that have permission to access the device's native media repository. These applications may query, retrieve, and operate upon the captured media files registered in the system media library 175.

To illustrate the bidirectional nature of this cross-application access, FIG. 4 further depicts external applications 435 issuing an "Access Media Files" message to operating system photos 425, representing a third-party application exercising its permission to retrieve media content from the native media repository. In response, operating system photos 425 returns a "Return Media Content" message—depicted as a dashed return arrow—to external applications 435, completing the access transaction and delivering the requested media files to the requesting application.

The dual-perspective capture event produces media files that are pushed once per perspective to the device file system. These pushed media files become accessible through two organizationally distinct access pathways: the application's internal gallery with its purpose-built filtering, grouping, and browsing capabilities; and the device's native system media library with its universal cross-application accessibility. This process eliminates the need to maintain duplicate physical copies of captured media and conserves device storage.

Figure 5:
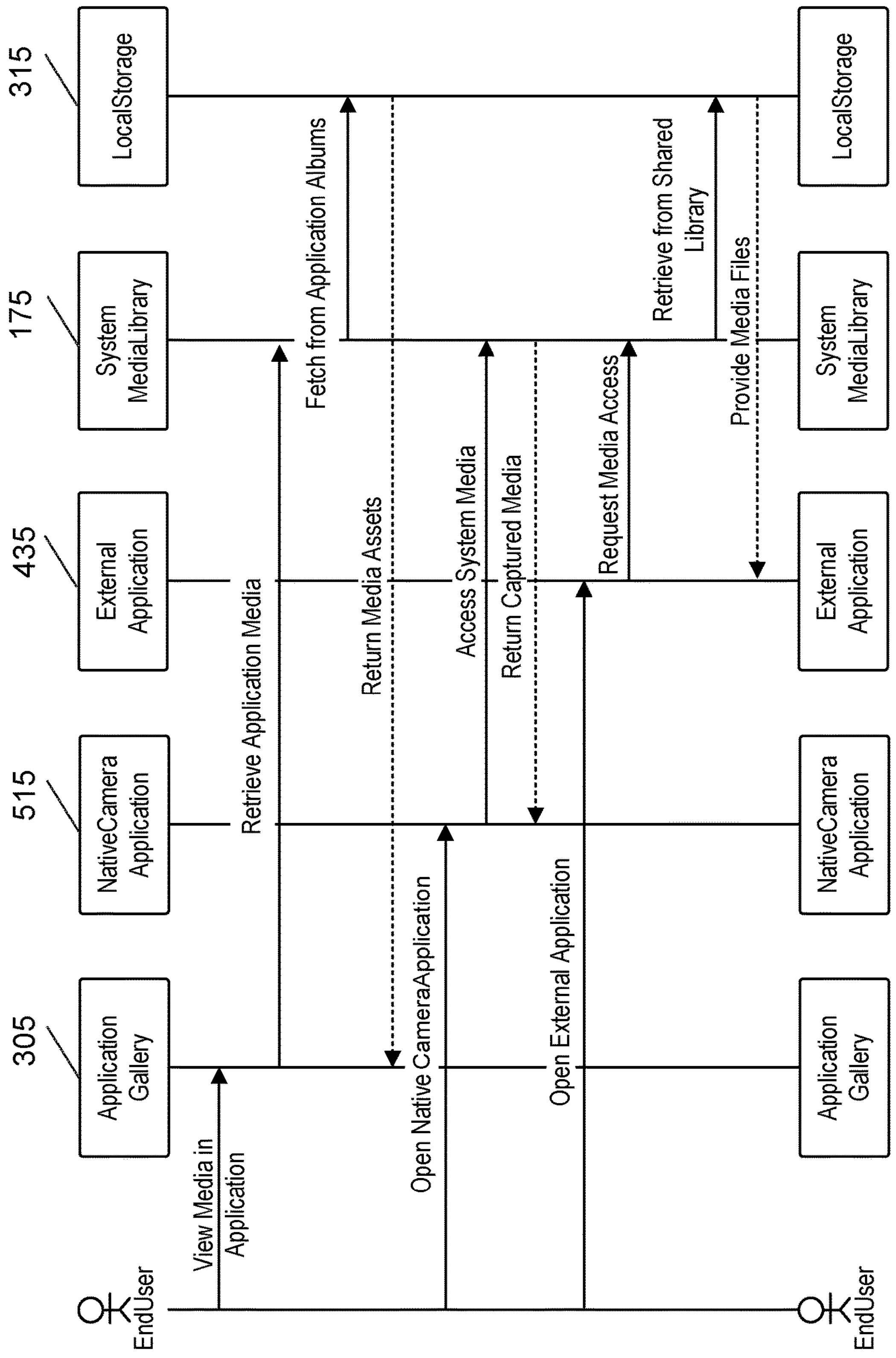
FIG. 5 is a sequence diagram illustrating three distinct but interrelated access pathways through which an end user may retrieve and interact with dual-perspective media files captured by the application.

FIG. 5 is a sequence diagram illustrating three distinct but interrelated access pathways through which an end user may retrieve and interact with dual-perspective media files captured by the application. Specifically, the sequence diagram traces the interaction sequences that enable captured media to be viewed within the application's dedicated gallery, accessed through the device's native camera application, and retrieved by third-party external applications. These steps may be performed without requiring the end user to perform any additional storage or export steps beyond the original capture event.

Access Pathway 1: In-Application Media Viewing

The first access pathway depicted in FIG. 5 may be initiated when the end user issues a "View Media in Application" action directed at the application gallery 305. This user action may represent the end user navigating to the application's dedicated gallery interface with the intent of browsing the dual-perspective media content captured within the application.

Upon receiving this request, the application gallery 305 may issue a "Retrieve Application Media" message to the system media library 175. The "Retrieve Application Media" message may instruct the system media library 175 to locate and return all media assets that are indexed as belonging to the application's dedicated album structures (e.g., simultaneously captured portrait-orientation and landscape-orientation). By routing this retrieval request through the system media library 175 rather than directly accessing local storage 325, the application gallery 305 operates within the platform's security and privacy standards governing media access.

The system media library 175 in turn issues a "Fetch from Application Albums" message to local storage 315. The "Fetch from Application Albums" message directs the physical file storage subsystem to retrieve the media files residing within the application's dedicated album directories. The "Fetch from Application Albums" message may translate the abstract, library-level retrieval request into a concrete file system access operation, returning the physical media file data from the application's allocated on-device storage.

Local storage 315 returns the retrieved media assets to the application gallery 305 via a "Return Media Assets" response message, depicted in FIG. 5 as a dashed return arrow traversing from Local Storage back through the interaction chain to the Application Gallery. Upon receipt of these media assets, the application gallery 305 may render and present the full collection of application-generated dual-perspective content to the end user within the application's dedicated gallery interface.

Access Pathway 2: Native Camera Application Access

The end user may issue an "Open Native Camera Application" action directed at the native camera application 515. Native camera application 515 is the system's default camera and media management application. The end user may prompt the device's default camera or system photos application to launch with the intent of viewing media content through the operating system's standard media interface.

Native camera application 515 may issue an "Access System Media" message to the system media library 175. The "Access System Media" message may prompt the native camera application to query the system media library for media files. The "Access System Media" message may include captured media from the originating application and registered in the system media library 175 through the Single-Write Dual-Access Pattern described in connection with FIG. 4. Because the dual-perspective media files were registered in the system media library 175 at the time of capture, they are present in the system media library 175 index and are retrievable by the native camera application 515 without any additional user action or file transfer step.

The system media library 175 may return the relevant media content to the native camera application 515 via a "Return Captured Media" response message, depicted as a dashed return arrow. This response may deliver the dual-perspective media files to the native camera application 515 for display within the operating system's native media browsing interface. The end user may view, organize, share, or otherwise interact with the application's dual-perspective captures through the device's standard system-level photo and video management environment, without navigating back to the originating application.

Access Pathway 3: External Third-Party Application Access

The end user may issue an "Open External Application" action directed at the external application 435. The "Open External Application" action may prompt the launch of a third-party application that has been granted the device operating system's media access permission.

External application 435 may issue a "Request Media Access" message to the system media library 175. The External Application 435 may query the system media library for accessible media files. The dual-perspective media files registered by the originating application at capture time are present in the system media library 175 index and therefore discoverable by any application with appropriate media access permissions.

Upon receiving this request, the system media library 175 may issue a "Retrieve from Shared Library" message to local storage 315. The "Retrieve from Shared Library" message may prompt the physical file storage subsystem to retrieve the media files from the shared system media library directory. This is distinguished from the application-specific album directories accessed in the first access pathway. This distinction reflects the dual-access architecture of the system: the same physical files are accessible through both application-specific directory paths (used by the application gallery 305) and through the shared system library path (used by the native camera application and external applications), without maintaining redundant physical copies.

Local storage 315 may return the requested physical media files to the external application 435 via a "Provide Media Files" response message, depicted as a dashed return arrow. External application 435 may receive the dual-perspective media content and may present, process, upload, edit, or otherwise operate upon the files within its own application context, completing the third access pathway.

Software Transform Pipeline Implementations: Incorporates All the Features of FIGS. 1-5 (and the Corresponding Description) and Described in Detail in FIGS. 6-9

Figure 6:
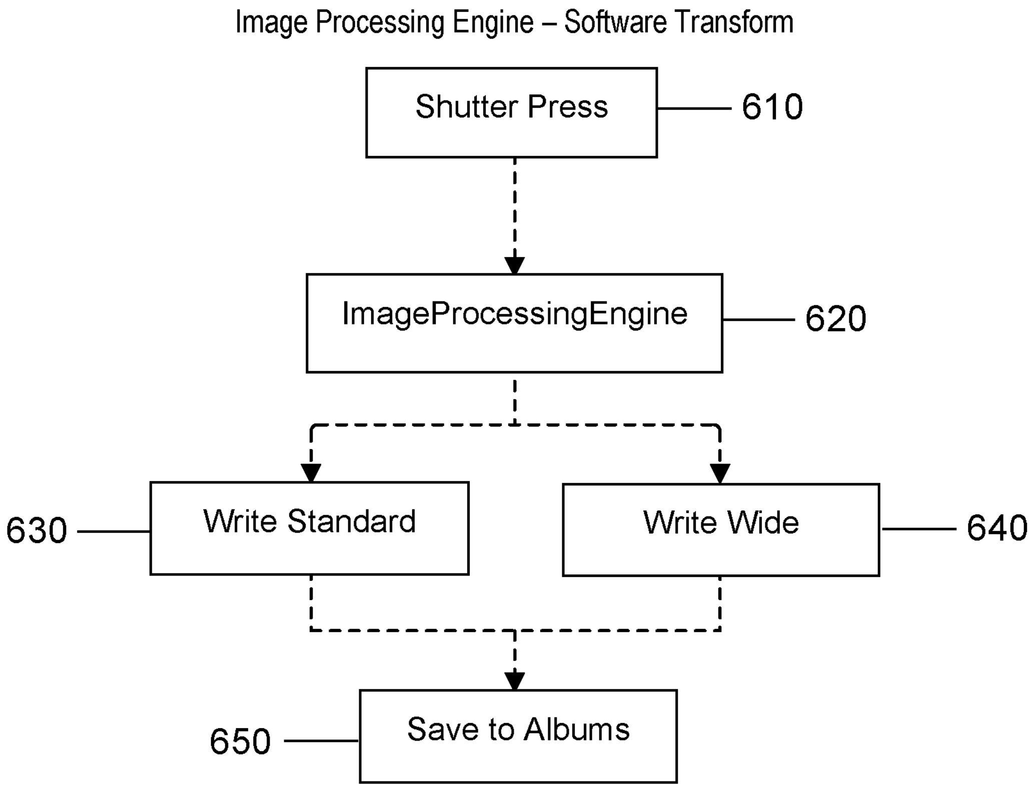
FIG. 6 depicts a flow diagram for sequential and branching data flow that occurs from a capture event through the concurrent writing of two independently oriented media files and their subsequent storage in application-specific album structures.

FIG. 6 depicts a flow diagram for sequential and branching data flow that occurs from a capture event through the concurrent writing of two independently oriented media files and their subsequent storage in application-specific album structures. The software-level transformation operations generate dual-perspective media outputs applied to captured image data, rather than through direct hardware-level multi-camera parallelization.

Shutter press 610 may initiate the capture event and passes the raw media data or capture command downstream to the image processing engine 620. Image processing engine 620 processes the captured data and produces two distinct output streams: one formatted for the standard portrait orientation and one formatted for the wide landscape orientation. These two output streams are dispatched concurrently to write standard 630 and write wide 640 respectively, as represented by the two diverging arrows from the image processing engine 620 node. The concurrent dispatch of both write operations is architecturally significant: by initiating both file-writing operations in parallel rather than sequentially, the pipeline minimizes the total time elapsed between the user's capture command and the availability of both output files, and ensures that the two perspectives are temporally aligned at the processing level.

Shutter press 610 event may be platform-agnostic at this level of abstraction; in certain embodiments, it corresponds to a tap gesture delivered to the application's capture control layer through a cross-platform UI framework (such as Flutter/Dart), which then dispatches the capture command to the underlying native camera subsystem via a platform bridge. Shutter Press 610 may be configured to activate the entire dual-output processing pipeline. Shutter Press 610 may be the entry point of the software transform pipeline and encapsulate the user's intent to simultaneously capture both a standard-perspective and a wide-perspective media file.

Image processing engine 620 may perform the image processing computations (e.g., cropping, scaling, aspect ratio adjustment, and any additional software transforms) that derive the standard-orientation (portrait, 9:16 aspect ratio) and wide-orientation (landscape, 16:9 aspect ratio) output files from the captured sensor data. In certain embodiments, the image processing engine 620 may process the raw image or video data received from the camera hardware and generate two processed media streams, each formatted for a distinct orientation and field of view. In contrast to the direct hardware-level parallelization approach described in FIG. 10 (which describes a hardware implementation achieves simultaneous dual-perspective output through concurrent native camera sessions at the AVFoundation level), the software transform implementation achieves simultaneous dual-perspective output through post-capture software processing applied to one or more raw sensor outputs Upon completion of both write operations, the outputs of write standard 630 and write wide 640 converge at save to albums 650. The outputs are represented by two arrows merging into the final stage node. The save to albums 650 stage persists both files to the application's album structures, completing the software transform pipeline and making the dual-perspective capture available for browsing, management, and cross-application access.

Write standard 630 may be the file-writing stage responsible for encoding and persisting the portrait-orientation (standard-perspective, 9:16 aspect ratio) media output generated by the image processing engine 620. The write standard 630 stage produces an independent media file (e.g., a photograph or video recording) formatted in the vertical portrait orientation. Write wide 640 is configured to encode the landscape-orientation (wide-perspective, 16:9 aspect ratio) media output generated by the image processing engine 620. Write wide 640 stage operates in parallel with the write standard stage, producing an independent media file formatted in the horizontal landscape orientation.

Figure 7:
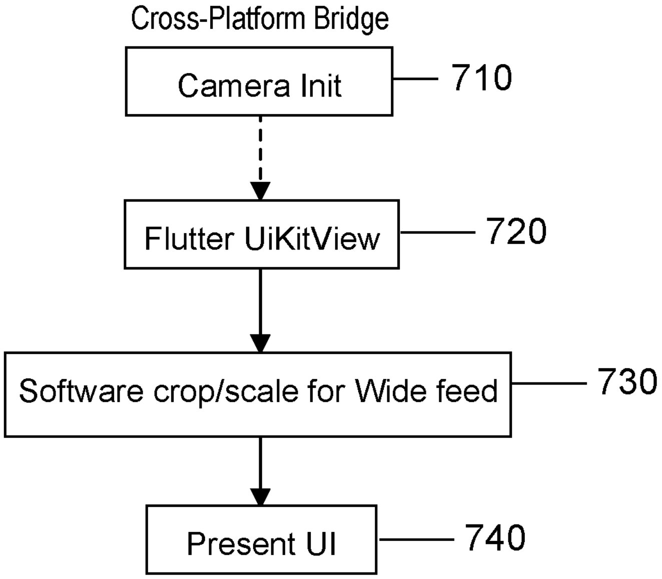
FIG. 7 depicts a flow diagram illustrating the cross-platform bridge architecture of a first implementation embodiment of the system.

FIG. 7 depicts a flow diagram illustrating the cross-platform bridge architecture of a first implementation embodiment of the system. In particular, the cross-platform bridge includes sequential stages by which the application initializes camera hardware, establishes a native camera preview within a cross-platform UI framework, applies software-level image transformations to the wide-angle camera feed, and presents the assembled dual-perspective interface to the end user. The diagram covers a cross-platform application framework (such as Flutter/Dart) that achieves native camera access and a dual-feed display on a mobile device operating system.

Camera init 710 may be the camera initialization stage in which the device's camera hardware is configured and activated in preparation for dual-feed preview and capture operations. In certain embodiments, Camera init 710 encompasses the configuration of one or more camera inputs-including both a standard wide-angle camera and an ultra-wide-angle camera—and the establishment of a capture session that will supply live video frames to the preview layer.

Flutter UiKitView 720 may be the cross-platform bridge component through which the cross-platform application framework (e.g., Flutter/Dart) embeds a native iOS view controller—specifically a camera preview view—directly within the application's cross-platform UI layout. The Flutter UiKitView mechanism (corresponding to the UiKitView widget in Flutter's iOS platform-view embedding API) may allow a natively rendered camera preview layer to be hosted within a Flutter widget tree to enable the cross-platform framework to display hardware-accelerated camera output without requiring the framework itself to manage the camera pipeline at the native level. Flutter UiKitView 720 may be the architectural interface point between the cross-platform UI layer and the underlying native iOS camera subsystem, providing the bridge through which live camera frames flow from the native capture session into the cross-platform display environment.

Software crop/scale for wide feed 730 may be the image processing stage in which the live video feed from the ultra-wide-angle camera is subjected to software-level cropping and scaling operations to produce the landscape-orientation wide-perspective display output. Because the ultra-wide-angle sensor may capture a broader field of view than is desired for the landscape display region, the software processing stage may apply a crop and scale transform to the raw ultra-wide feed to produce a visually formatted wide-perspective output that conforms to the target aspect ratio and field of view for the second display region. In some embodiments, the wide angle sensor may capture the This stage represents the software transform approach to wide-feed formatting (in contrast to the hardware-level GPU compute approach described in FIG. 10).

In a single-camera embodiment, the system may operate using only one physical lens to produce both the portrait-orientation output and the landscape-orientation output simultaneously from the same scene. The processor may capture image data from the single lens at the full sensor field of view. For the first display region, the captured image data may be rendered in a portrait orientation. For the second display region, the processor may apply a crop-and-scale operation to extract a region of the captured image data and resize it to conform to a landscape aspect ratio (e.g., 16:9). Both outputs may be displayed simultaneously and in real time on the interactable display, and both display the same scene. In some embodiments, single-camera mode may be activated automatically when device hardware restricts simultaneous multi-camera access, or may be user-selectable through the settings interface.

Present UI 740 may assemble the dual-perspective user interface, including the standard camera feed in the first (portrait) display region and the software-processed wide-angle feed in the second (landscape) display region. Present UI 740 may correspond to the Flutter UI layer presenting the complete dual-view camera interface to the user, with both preview regions simultaneously visible and continuously updated with live camera data.

Figure 8:
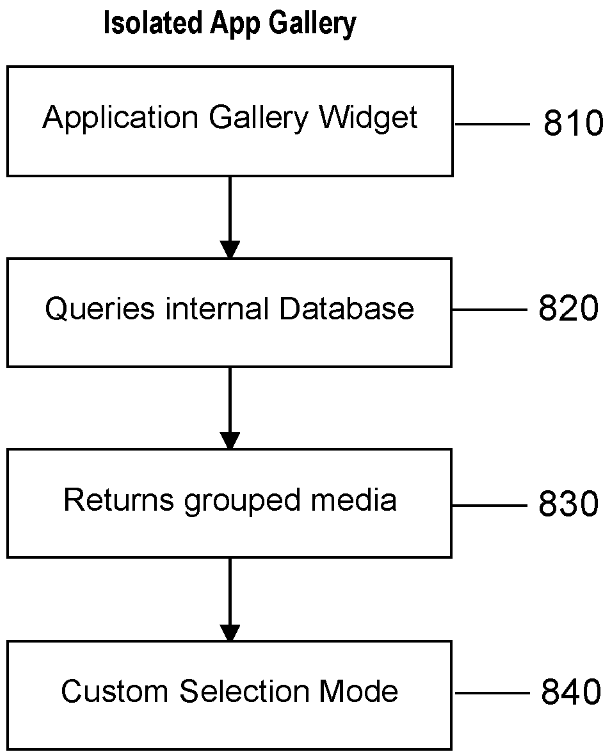
FIG. 8 depicts a flow diagram illustrating the sequential data flow from the application gallery widget layer through internal database queries to the return of grouped media content and the activation of a custom selection mode.

FIG. 8 depicts a flow diagram illustrating the sequential data flow from the application gallery widget layer through internal database queries to the return of grouped media content and the activation of a custom selection mode. FIG. 8 describes the structural organization and operational behavior of the application's purpose-built media browsing subsystem, which is architecturally isolated from the device's broader native photo library to present only media generated within the application.

Application gallery widget 810 may be configured to present a UI through which the end user interacts directly to browse, filter, and manage dual-perspective media content captured within the application. Application gallery widget 810 may be configured to render the gallery view (including thumbnail grids, filter controls, and selection indicators) and for dispatching data retrieval requests to the underlying internal database subsystem. In certain embodiments, the application gallery widget 810 is implemented as a SwiftUI view (GalleryView) that fetches assets exclusively from application-created album collections within the device's photo library.

Application gallery widget 810 may query the application's internal media database or album index to retrieve the set of media assets in a queries internal database 820 stage. In certain embodiments, this stage corresponds to a query against the device's PHPhotoLibrary system, specifically targeting the application-created PHAssetCollection albums (such as "Double View-Vertical" and "Double View-Horizontal"), using a PHImageManager to fetch the relevant assets. The query may be scoped by media type filter criteria (such as all media, photographs only, or video recordings only) to retrieve the appropriate subset of assets for display. The internal database query is architecturally distinct from a query against the device's full photo library: by querying only the application's designated album collections, the gallery retrieves exclusively the dual-perspective captures generated by the application, preserving the organizational isolation of the dedicated gallery environment.

After the internal database query results are processed, the query results are returned to the application gallery widget 810 in a grouped presentation format for a Returns grouped media 830 stage. In certain embodiments, the grouped media output includes both the standard portrait-orientation captures (from the "Double View-Vertical" album) and the landscape-orientation captures (from the "Double View-Horizontal" album), with corresponding portrait and landscape captures of the same scene associated through common capture-time identifiers or metadata. A deduplication step may be applied to the combined result set to prevent the same asset from appearing multiple times in the gallery view when results are fetched from multiple albums. The returned grouped media 830 set forms the complete, filtered content collection that the application gallery widget 810 renders in its grid layout.

When the end user initiates a batch selection operation within the application gallery widget 810, custom selection mode 840 is activated. In certain embodiments, custom selection mode 840 may be triggered by a long-press gesture or a drag gesture across multiple gallery items. Custom selection mode 840 may enable the user to select one or more media items for batch operations such as sharing or deletion. Custom selection mode 840 may provide selection state management, batch action controls (including select-all and deselect-all operations), and integration with the platform's native media deletion and sharing APIs. Custom selection mode 840 may be implemented as a dedicated UI state within the Application gallery widget 810 to allow the gallery to perform batch operations on the selected subset of the returned grouped media set.

Figure 9:
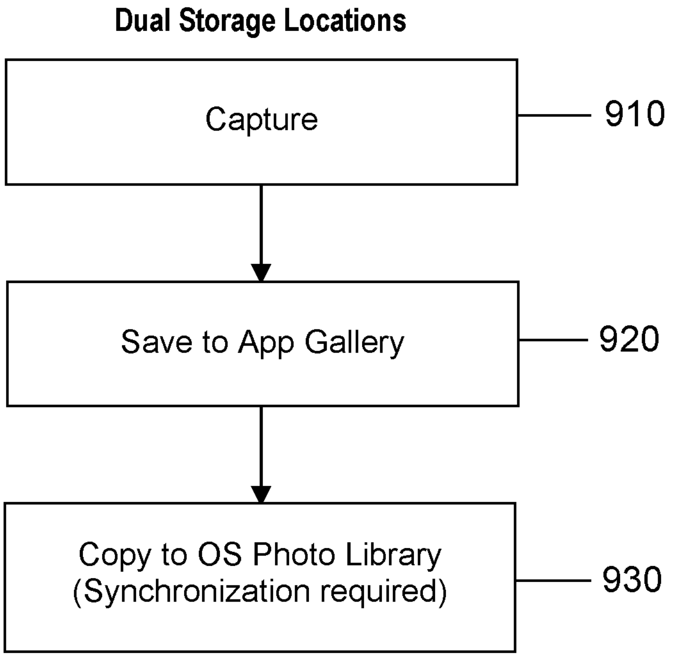
FIG. 9 depicts a sequential process through which a captured media file is first pushed to the application's internal gallery storage and subsequently written to the device operating system's native photo library.

FIG. 9 illustrates the dual storage location architecture of software transform pipeline. FIG. 9 depicts a sequential process through which a captured media file is first pushed to the application's internal gallery storage and subsequently written to the device operating system's native photo library. The diagram is labeled "Dual Storage Locations" and describes the two-step sequential storage approach in which the application gallery and the operating system photo library are maintained as separate storage targets.

Capture 910 may indicate the completion of a dual-perspective capture event. The dual-perspective capture event may be the moment at which the raw media data for both the standard-perspective and wide-perspective outputs has been produced by the camera subsystem and is ready for storage.

Save to App Gallery 920 may indicate the storage stage in which the captured media files are written to the application's internal gallery storage structure. This step establishes the media within the application's dedicated gallery environment, making the files immediately accessible through the application's isolated gallery interface. In certain embodiments, this stage corresponds to saving the captured media to the application's local storage directory or to an application-managed database, from which the application gallery widget 810 retrieves assets for display Copy to OS Photo Library 930 is the second storage stage in which the media files already written to the application's internal gallery are additionally copied or registered within the device operating system's native photo library. The application's internal gallery and the operating system's native photo library may be situated at two separate storage locations. Maintaining consistency between the two storage locations may require synchronization logic. This synchronization requirement contrasts with the single-storage, dual-access architecture depicted in FIG. 13, in which a single write to custom PHAssetCollection albums within the system PHPhotoLibrary inherently satisfies both in-app gallery and cross-application accessibility requirements without requiring separate synchronization operations.

Direct Hardware-Level API: Incorporates All the Features of FIGS. 1-5 (and the Corresponding Description) and Described in Detail in FIGS. 10-13

Figure 10:
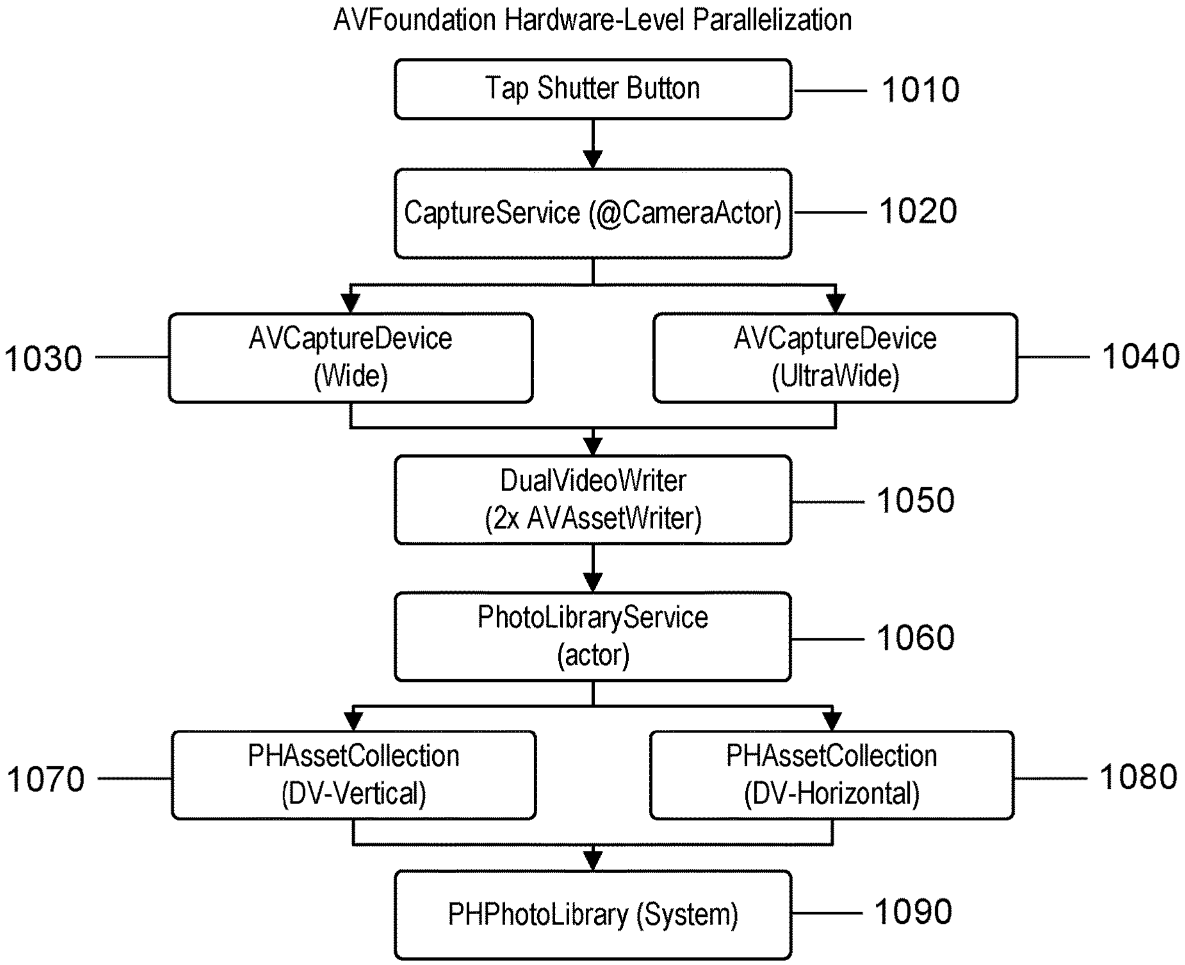
FIG. 10 depicts a component architecture diagram illustrating the AVFoundation hardware-level parallelization pipeline.

FIG. 10 depicts a component architecture diagram illustrating the AVFoundation hardware-level parallelization pipeline. The "AVFoundation Hardware-Level Parallelization" describes the specific Apple framework components and their interconnections in a direct native Swift implementation of the simultaneous dual-capture system.

Tap shutter button 1010 represents the user-initiated capture trigger event, corresponding to the user tapping the shutter button in the application's native SwiftUI capture interface. This action initiates the downstream AVFoundation hardware-level parallelization pipeline by invoking the capture command through the CaptureService actor interface.

CaptureService (@CameraActor) 1020 may be a Swift actor isolated to a custom global actor (@CameraActor). The actor isolation prompts execution of AVFoundation operations on a dedicated serial execution context to prevent data races during concurrent dual-stream operations without requiring manual dispatch queue management. The Capture- Service manages the AVCaptureMultiCamSession configuration, dual camera device inputs, photo and video outputs, zoom control, and capture lifecycle. Upon receiving the shutter tap trigger, the CaptureService simultaneously activates both camera output paths (e.g., dispatching concurrent capture commands to both AVCaptureDevice inputs) to achieve true hardware-level simultaneous capture.

AVCaptureDevice (Wide) 1030 is the wide-angle camera hardware device input, corresponding to the device's built-in standard wide-angle camera (builtInWideAngleCamera in the AVFoundation API). AVCaptureDevice (Wide) 1030 captures the portrait-orientation (9:16 aspect ratio) standard-perspective video or photo output. AVCaptureDevice (Wide) 1030 is one of two camera device inputs added to the AVCaptureMultiCamSession managed by the CaptureService.

AVCaptureDevice (UltraWide) 1040 is the ultra-wide-angle camera hardware device input, corresponding to the device's built-in ultra-wide camera (builtInUltraWideCamera in the AVFoundation API). AVCaptureDevice (UltraWide) 1040 is configured to capture the landscape-orientation (16:9 aspect ratio) wide-perspective video or photo output. AVCaptureDevice (UltraWide) 1040 operates concurrently with the Wide device within the same AVCaptureMultiCamSession, enabling true hardware-level simultaneous dual-camera access without software frame routing or latency overhead.

DualVideoWriter (2× AVAssetWriter) 1050 is the concurrent video file writing component, comprising two independent AVAssetWriter instances operating in parallel on a serial dispatch queue. Each AVAssetWriter instance receives sample buffers directly from its respective camera output (e.g., one writing the portrait-orientation stream from the Wide device and one writing the landscape-orientation stream from the UltraWide device) and encodes them independently to separate.mov output files. In some implementations, both writers use the HEVC (H.265) codec at a matched bitrate (e.g., 12 Mbps) with B-frame encoding enabled, and audio is captured at 48 kHz AAC to match the native recording sample rate. The.mov container preserves platform-native metadata including orientation flags, gyroscope data, and color space tags. For photograph captures, the equivalent parallel operation is performed by dual AVCapturePhotoOutput instances, each triggered simultaneously on a single shutter press.

PhotoLibraryService (actor) 1060 is the actor-isolated storage service configured to push media files to the device's photo library. Implemented as a Swift actor, the PhotoLibraryService 1060 provides compile-time guarantees of thread safety for all photo library operations, which is critical during dual-capture completion scenarios. The PhotoLibraryService 1060 receives the media files from the DualVideoWriter 1050 and initiates a write operation to the system photo library through PHPhotoLibrary.shared( ).performChanges, creating or updating the appropriate orientation-specific album collections.

PHAssetCollection (DV-Vertical) 1070 is the application-created portrait-orientation album collection within the system PHPhotoLibrary 1090, corresponding to the "Double View-Vertical" custom album. This PHAssetCollection 1070 stores the portrait-orientation (9:16) captures produced by the Wide camera device and serves as the organizational structure through which the application's gallery retrieves and presents standard-perspective media content. The album is created on first use by the PhotoLibraryService 1060 if it does not already exist, using a photo library change request.

PHAssetCollection (DV-Horizontal) 1080 is the application-created landscape-orientation album collection within the system PHPhotoLibrary 1090, corresponding to the "Double View-Horizontal" custom album. This PHAssetCollection 1070 stores the landscape-orientation (16:9) captures produced by the UltraWide camera device and serves as the organizational structure for wide-perspective media content in the application's gallery. Both PHAssetCollection instances are populated through a single atomic PHPhotoLibrary 1090 change request per capture event, ensuring transactional consistency between the two album writes.

PHPhotoLibrary (System) 1090 is the device's system-level photo library managed by the iOS Photos framework. Because both the DV-Vertical and DV-Horizontal PHAssetCollections 1070, 1080 exist as custom albums within the system PHPhotoLibrary 1090, media written to these albums is simultaneously accessible through the application's dedicated GalleryView through the iOS Photos application (where the albums appear alongside the user's personal albums), and through any third-party application with standard photo library access permissions. This single-storage, dual-access architecture (achieved through the placement of custom album collections within the system PHPhotoLibrary 1090) eliminates duplication overhead while providing universal accessibility.

Figure 11:
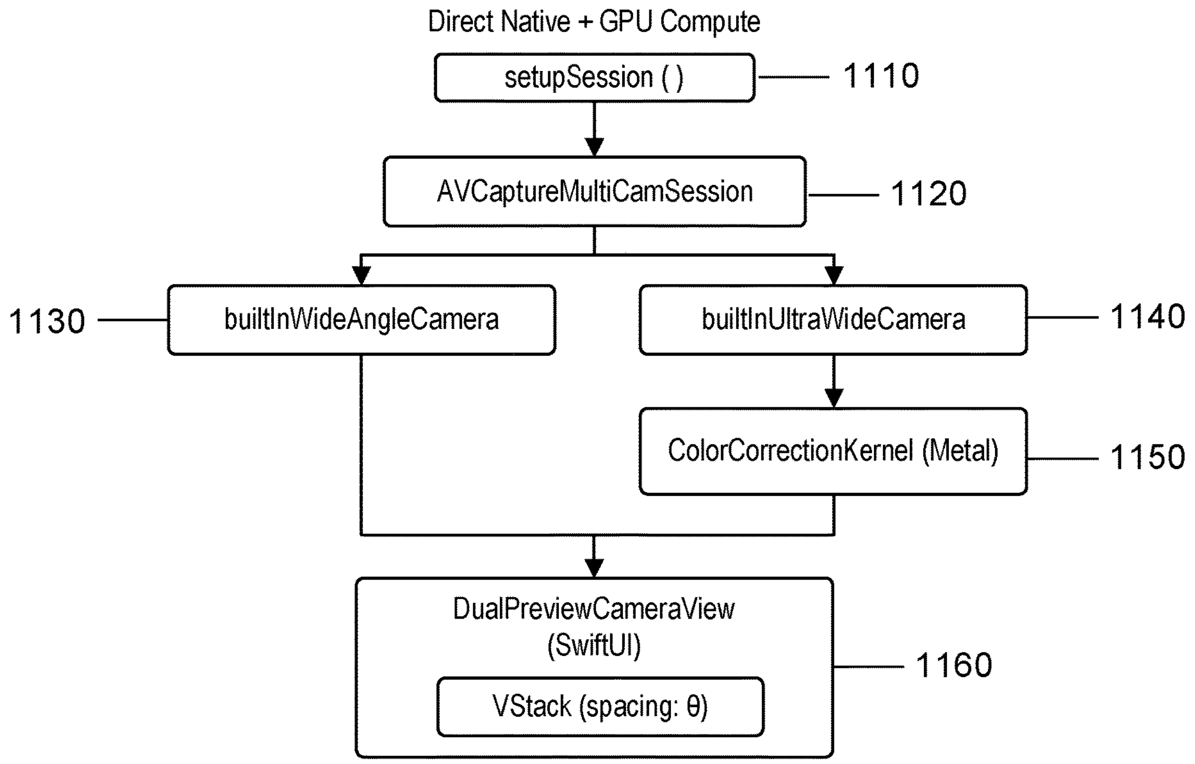
FIG. 11 depicts a component architecture diagram illustrating the specific Apple framework components and their interconnections in the native iOS Swift implementation of the simultaneous dual-view camera interface.

FIG. 11 depicts a component architecture diagram illustrating the specific Apple framework components and their interconnections in the native iOS Swift implementation of the simultaneous dual-view camera interface. FIG. 11 describes the hardware and software components engaged from session setup through the rendering of the dual-perspective live preview in the application's user interface.

setupSession( ) 1110 is the session initialization function call that triggers a dual-camera session configuration sequence. This function, called on the CaptureService actor, orchestrates any or all of 1) the creation of the AVCaptureMultiCamSession, 2) the addition of both camera device inputs and their corresponding outputs, 3) the configuration of pixel format selection (using a three-tier fallback strategy to handle hardware constraints), and 4) the establishment of the dual preview layer connections. The setupSession( ) call is invoked when the user activates the camera function within the application.

AVCaptureMultiCamSession 1120 enables simultaneous hardware-level access to multiple camera sensors on supported devices. Unlike the standard AVCaptureSession (which supports only a single camera at a time), AVCaptureMultiCamSession 1120 allows both the wide-angle and ultra-wide-angle camera inputs to be added to a single session and operated concurrently, with the operating system managing the hardware resource allocation between them. The use of AVCaptureMultiCamSession 1120 is a technical enabler of the simultaneous nature of the direct native implementation's hardware level. AVCaptureMultiCamSession 1120 is configured to drive both camera feeds by a single session operating at the hardware level. AVCaptureMultiCamSession 1120 eliminates the software-level coordination and latency overhead that would be required by alternative multi-session or frame-routing approaches.

builtInWideAngleCamera 1130 is the standard wide-angle camera device input added to the AVCaptureMultiCamSession 1120. builtIn WideAngleCamera 1130 provides the live video frames for the first display region (portrait-orientation, 9:16 aspect ratio) of the dual-preview interface. Its output is delivered directly to an AVCapture VideoPreviewLayer 1160 for hardware-accelerated display in the first region of the DualPreviewCamera View, without requiring software-level frame processing for preview purposes.

builtInUltraWideCamera 1140 is the ultra-wide-angle camera device input added to the AVCaptureMultiCamSession 1120. This device provides the live video frames for the second display region (landscape-orientation, 16:9 aspect ratio) of the dual-preview interface. The ultra-wide feed may be routed through the Color Correction Kernel (Metal) component before delivery to the second display region to ensure visual consistency with the standard feed.

Color correction kernel (Metal) 1150 is the GPU compute shader component, implemented as a Metal kernel (Color Correction Kernel.metal), that performs real-time color correction on the ultra-wide camera feed to visually match it to the standard wide-angle feed. The Metal compute shader runs on the device's GPU and analyzes the color characteristics of both camera feeds, applying per-frame adjustments to the ultra-wide feed including exposure correction, white balance matching, saturation normalization, shadow and highlight level alignment, and hue rotation. Color correction kernel 1150 operates at the preview frame rate (e.g., 60 frames per second) to maintain seamless visual consistency between the two simultaneously displayed perspectives, compensating for the inherent optical and sensor differences between the wide-angle and ultra-wide-angle lenses. This GPU-accelerated approach to color correction is architecturally distinct from the software-level color processing in the cross-platform bridge implementation: by operating as a Metal compute shader directly on the GPU, the Color Correction Kernel 1150 achieves the required real-time frame rate without imposing CPU processing overhead on the main application thread.

In some embodiments, the color correction may be performed by a GPU compute shader. On devices supporting Apple Metal framework, the GPU compute shader may be implemented as a Metal compute kernel (e.g., ColorCorrectionKernel.metal) processing BGRA texture data or YUV (NV12) planar video buffers. On devices supporting OpenGL ES (GLES), the GPU compute shader may be implemented as a GLES 3.1 compute shader performing equivalent color correction operations. The GPU compute shader may apply per-frame adjustments including exposure correction, white balance matching via color temperature shift, saturation normalization, shadow and highlight level alignment, hue rotation, and vibrance adjustment at the preview frame rate (e.g., 60 fps) without imposing CPU processing overhead.

DualPreviewCameraView (SwiftUI)/VStack (spacing: 0) 1160 is the SwiftUI view component that assembles and renders the dual-perspective live preview interface. The DualPreviewCameraView 1160 uses a VStack layout with zero inter-item spacing (VStack (spacing: 0)) to arrange the two camera preview regions in a vertically stacked, non-overlapping configuration, with the standard wide-angle preview occupying the top region (portrait, 9:16) and the color-corrected ultra-wide preview occupying the bottom region (landscape, 16:9). Each preview region is rendered through its own AVCaptureVideoPreviewLayer—a hardware-accelerated Core Animation layer that receives frames directly from the capture pipeline—without requiring intermediate frame buffers, image processing, or format conversions for the preview display itself. The VStack (spacing: 0) layout ensures that the two display regions are spatially contiguous and non-overlapping, directly satisfying the non-overlapping regions requirement of the system.

Figure 12:
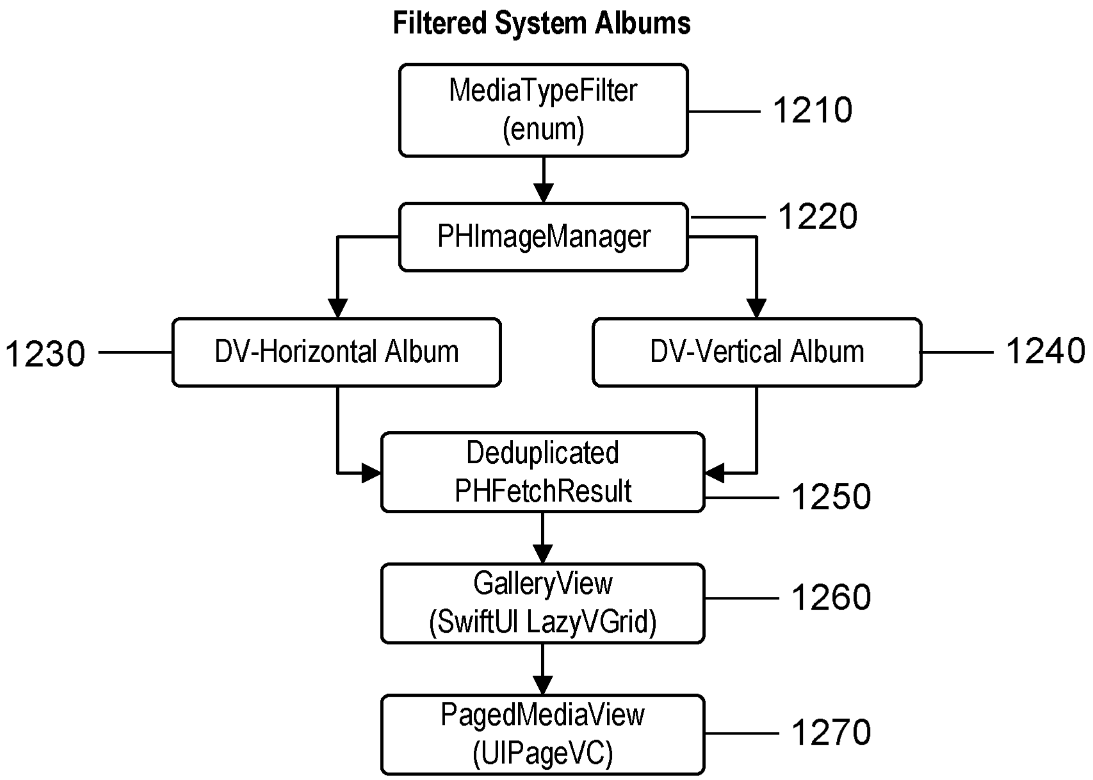
FIG. 12 illustrates the data flow from user-applied media type filtering through album-specific asset fetching, result deduplication, and final rendering in the scrollable gallery grid and fullscreen media viewer.

FIG. 12 depicts the filtered system albums gallery architecture of the direct native Swift implementation. FIG. 12 illustrates the data flow from user-applied media type filtering through album-specific asset fetching, result deduplication, and final rendering in the scrollable gallery grid and fullscreen media viewer. FIG. 12 includes native iOS Photos framework components and SwiftUI rendering components that collectively implement the application's dedicated gallery in the direct native implementation embodiment.

Media Type Filter 1210 represents the user-selectable content filter criteria available in the gallery interface. The Media Type Filter enum defines discrete filter states—such as All (photos and videos), Videos only, and Photos only—that govern which subset of the application's media assets are fetched and displayed. The active Media Type Filter 1210 value is passed as a parameter to the PHImageManager 1220 to constrain the asset fetch operations to the appropriate media type. When the end user changes the active filter in the gallery UI, the Media Type Filter 1210 enum value is updated and the fetch operations are re-executed to refresh the displayed content.

PHImageManager 1220 may fetch media assets from the application's designated PHAssetCollection albums in response to the active Media Type Filter criteria. The PHImageManager may execute fetch requests against both the DV-Horizontal Album and the DV-Vertical Album. For thumbnail delivery, the PHImageManager uses an opportunistic delivery mode, providing an initial fast low-quality thumbnail preview followed by a high-quality replacement as the full-resolution asset becomes available, supporting responsive gallery rendering for large media collections.

DV-Horizontal Album 1230 is the PHAssetCollection instance representing the application's landscape-orientation album ("Double View-Horizontal") within the system PHPhotoLibrary. The PHImageManager queries this album to retrieve all landscape-orientation media assets matching the active filter criteria. Assets in this album represent the wide-perspective (16:9) captures produced by the ultra-wide camera.

DV-Vertical Album 1240 is the PHAssetCollection instance representing the application's portrait-orientation album ("Double View-Vertical") within the system PHPhotoLibrary. The PHImageManager queries this album to retrieve all portrait-orientation media assets matching the active filter criteria. Assets in this album represent the standard-perspective (9:16) captures produced by the wide-angle camera.

Deduplicated PHFetchResult 1250 is the combined, deduplicated fetch result set produced by merging the asset collections returned from the DV-Horizontal Album and DV-Vertical Album queries. Because the same capture event produces assets in both albums, and because certain filter states (such as "All") retrieve from both albums simultaneously, the merged result set is subjected to a deduplication operation based on asset identifiers to ensure that no individual media file appears more than once in the gallery display. The deduplicated PHFetchResult represents the final, ordered set of media assets that will be rendered in the gallery grid.

GalleryView (SwiftUI LazyVGrid) 1260 is the SwiftUI gallery grid view that renders the deduplicated PHFetchResult as a scrollable thumbnail grid. The Lazy VGrid layout loads thumbnail views on demand as the user scrolls, using the PHImageManager's opportunistic delivery mode to provide responsive thumbnail rendering across large media libraries. The GalleryView supports pagination, loading an initial batch of items and fetching additional batches as the user approaches the bottom of the grid. It also provides multi-selection mode to enable batch share and delete operations on selected assets.

PagedMedia View (UIPageVC) 1270 is the fullscreen media viewer component, implemented as a UIPage ViewController wrapped in a SwiftUI representable (PagedMedia View), that enables swipe-based navigation through the ordered media assets of the deduplicated PHFetchResult. When the user taps a thumbnail in the GalleryView, the PagedMedia View opens with the selected asset as the initial page, with adjacent assets preloaded on either side to support immediate swipe navigation. For photographs, a nested scroll view provides pinch-to-zoom interaction, with zoom state communicated back to the page controller to prevent conflicting gesture interpretations while zoomed. For video assets, inline playback with standard transport controls is provided.

Figure 13:
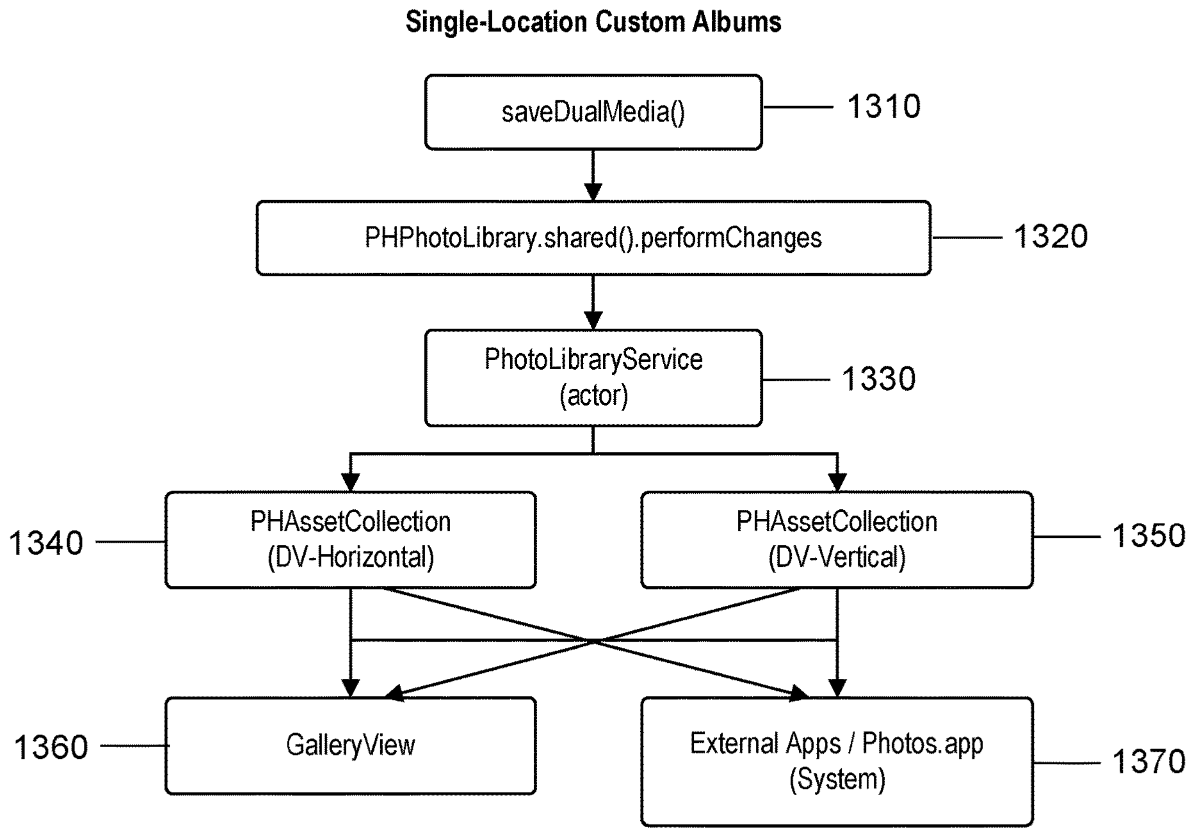
FIG. 13 illustrates the single-location custom albums storage architecture of the direct native Swift implementation

FIG. 13 illustrates the single-location custom albums storage architecture of the direct native Swift implementation. FIG. 13 depicts the specific Apple framework API components and their interconnections in the process of saving dual-perspective media to orientation-specific custom PHAssetCollection albums within the system PHPhotoLibrary, and the resulting simultaneous accessibility of those media files from both the application's internal GalleryView and from external applications and the system Photos application. The diagram is labeled "Single-Location Custom Albums" and provides a detailed view of the storage service architecture that implements the Single-Write Dual-Access Pattern at the API level.

saveDualMedia( ) 1310 is configured to initiate the dual media storage operation upon completion of a dual-perspective capture event. This function is invoked by the Dual VideoWriter's completion handler (for video captures) or by the photo capture delegate (for photo captures) after both orientation-specific media files have been successfully written to temporary storage. The saveDualMedia( ) function call dispatches the storage request to the PhotoLibraryService actor, passing the file URLs or data for both the portrait-orientation and landscape-orientation captures.

PHPhotoLibrary.shared( ).performChanges 1320 is the Apple Photos framework's atomic change request API, through which all modifications to the system photo library (including asset creation and album membership assignment) are performed. By executing both the portrait-orientation and landscape-orientation asset additions within a single performChanges block, the system ensures that both files are written to the photo library as an atomic operation: either both succeed or both fail together, maintaining transactional consistency between the two orientation-specific album entries. This atomic write approach prevents situations in which two albums in inconsistent states during a partial failure.

PhotoLibraryService (actor) 1330 is the Swift actor component that encapsulates all photo library storage operations, providing compile-time thread-safety guarantees through Swift's actor isolation model. The PhotoLibraryService manages the creation and maintenance of the two custom PHAssetCollection albums, executes the PHPhotoLibrary performChanges request, and handles album creation on first use. Actor isolation ensures that concurrent invocations of saveDualMedia( )—which may occur when both orientation streams complete simultaneously—are serialized at the actor boundary, preventing data races or duplicate photo library writes during concurrent completion events.

PHAssetCollection (DV-Horizontal) 1340 is the custom landscape-orientation album ("Double View-Horizontal") within the system PHPhotoLibrary, to which the landscape-orientation (16:9) media file is added during the saveDualMedia( ) operation. As a PHAssetCollection residing within the system PHPhotoLibrary, this album and its contents are simultaneously visible to the application's GalleryView and to the system Photos application and external applications (which access the broader PHPhotoLibrary).

PHAssetCollection (DV-Vertical) 1350 is the custom portrait-orientation album ("Double View-Vertical") within the system PHPhotoLibrary, to which the portrait-orientation (9:16) media file is added during the saveDualMedia( ) operation. Like the DV-Horizontal album, this PHAssetCollection is accessible through all three access pathways described in FIG. 14.

GalleryView 1360 represents the application's internal gallery interface, which accesses the media stored in the DV-Horizontal and DV-Vertical PHAssetCollection albums through the PHImageManager fetch mechanism described in FIG. 12. The crossed arrows connecting both PHAssetCollection components to both GalleryView 1360 and External Apps/Photos.app (System) 1370 in the diagram represent the dual-access property of the single-location storage architecture: each PHAssetCollection is accessible from both access contexts, and both PHAssetCollections together provide the complete set of dual-perspective captures to each access context.

External Apps/Photos.app (System) 1370 represents the collection of external access contexts—including the iOS system Photos application and any third-party application with PHPhotoLibrary access permissions—through which the media stored in the custom PHAssetCollection albums is accessible without any additional storage, export, or synchronization steps. Because the custom albums exist within the shared system PHPhotoLibrary instance (PHPhotoLibrary.shared( )), their contents are immediately and inherently visible to all applications with appropriate permissions, achieving the cross-platform accessibility goals of the system through the structural properties of the storage location itself rather than through explicit synchronization or duplication logic.

Additional Android Implementation: Incorporates All the Features of FIGS. 1-5 (and the Corresponding Description)

In an alternative native implementation targeting the Android operating system, the dual-camera capture system may be implemented using the Camera2 API. The Camera2 API may provide hardware-level access to individual camera sensors through a CameraManager service. The system may initialize CameraDevice instances for each physical camera and configure a CaptureSession with multiple output surfaces for simultaneous dual-sensor image data. Physical camera routing may use OutputConfiguration.setPhysicalCameraId( ) to direct specific physical lens feeds to designated encoder and preview surfaces.

The Android implementation may employ a multi-tier camera discovery mechanism. In a first tier, the system may query for LOGICAL_MULTI_CAMERA hardware level capability. In a second tier, getConcurrentCameraIds( ) determines supported concurrent camera combinations. In a third tier, the system may classify cameras by focal length: ultra-wide (less than 3 mm), standard wide (3-15 mm), telephoto (greater than 15 mm), with sensor pixel size tiebreaker. In a fourth tier, when the device hardware abstraction layer restricts multi-camera access, the system falls back to single-camera mode.

| Tier | Method | Devices | Notes |
|---|---|---|---|
| 1 | LOGICAL_MULTI_CAMERA capability | Pixel 7/8/9/10 Pro | Best path - OS-managed multi-sensor |
| 2 | getConcurrentCameraIds( ) | API 30+ devices | Concurrent camera support query |
| 3 | Brute-force probe (cached per fingerprint) | HAL-permissive devices | Novel: device fingerprint caching |
| 4 | Single-camera fallback (digital zoom) | Any device (inc. Samsung) | UW + 2.45x zoom workaround |

On devices where simultaneous multi-camera access (e.g., via hidden Camera Device 20, SYSTEM_CAMERA permission gating, resource cost inflation, or hardcoded package whitelists) is restricted, the system may implement a single-camera. A single lens may be selected (e.g., the ultra-wide-angle camera). The system may apply a digital zoom factor (e.g., approximately 2.45× via CONTROL_ZOOM_RATIO) to produce a simulated standard wide-angle perspective for preview, recording, and photo capture. Both portrait and landscape outputs are produced from this single sensor simultaneously relying on methods described in the description covering FIG. 1B and FIG. 2.

The Camera2 CaptureSession may transition between states: 2-surface preview (one surface per camera) during idle; 4-surface recording (2 preview TextureViews+2 MediaCodec encoder Surfaces) during active capture; and return to 2-surface after recording stops. Each encoder may be configured for HEVC (H.265) at approximately 12 Mbps with zero-copy Surface input, writing to an independent MediaMuxer instance. H.264 fallback when HEVC is unavailable. Dedicated drain threads per encoder with per-muxer synchronization locks may be available.

On Android, captured media files may be saved to the device MediaStore via ContentResolver (analogous to iOS PHPhotoLibrary). MediaStore operations may execute on background thread pools (Dispatchers.IO) to prevent UI blocking. Files are inserted into MediaStore. Video.Media.EXTERNAL_CONTENT_URI or MediaStore. Images.Media.EXTERNAL_CONTENT_URI, making captured media accessible to the system gallery, other applications, and cloud synchronization services.

Figure 14:
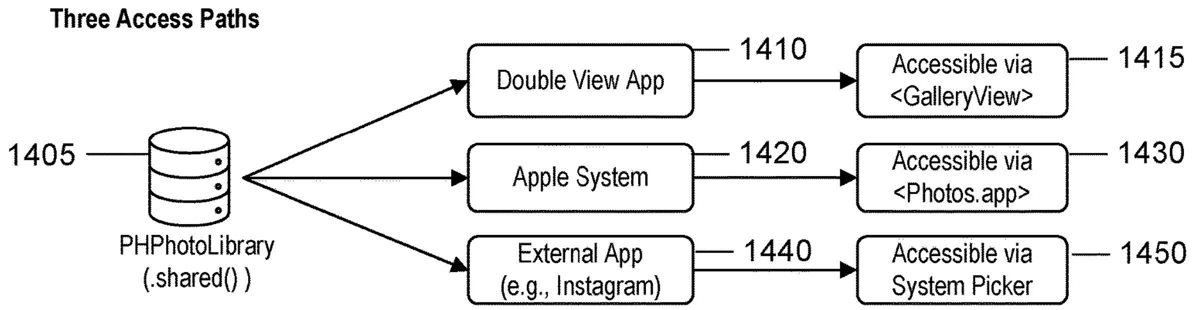
FIG. 14 is a component architecture diagram illustrating the three distinct access pathways through which dual-perspective media stored in the system PHPhotoLibrary is made accessible to different consumer applications In some implementations, the current subject matter can be configured to be implemented in a system 1500, as shown in FIG. 15

FIG. 14 is a component architecture diagram illustrating the three distinct access pathways through which dual-perspective media stored in the system PHPhotoLibrary is made accessible to different consumer applications. The diagram is labeled "FIG. 5 Diagram Update (Three Access Paths)" and provides a platform-specific, implementation-level elaboration of the cross-platform media access architecture depicted abstractly in FIG. 5, mapping the three access pathways to their specific iOS framework mechanisms. It depicts how a single shared PHPhotoLibrary instance (PHPhotoLibrary (.shared( )) simultaneously serves as the storage foundation for three categorically distinct access patterns: in-application access via the dedicated GalleryView, system-level access via the iOS Photos application, and third-party access via the system media picker.

By placing media in custom PHAssetCollection albums within the system PHPhotoLibrary at the moment of capture—through a single atomic performChanges operation—the system simultaneously and immediately enables all three access pathways without any subsequent synchronization, export, or duplication steps. The GalleryView access path provides the application's purpose-built organizational experience; the Photos.app access path provides native operating system integration and ecosystem features; and the System Picker access path provides broad third-party application interoperability—all derived from the same underlying storage event, with no additional storage overhead.

PHPhotoLibrary (.shared( )) 1405 is the shared, system-managed photo library instance—represented in the diagram as a database cylinder icon—that serves as the single authoritative storage location from which all three access pathways originate. In the iOS Photos framework, PHPhotoLibrary.shared( ) provides access to the device's unified photo library, within which the application's custom PHAssetCollection albums ("Double View-Vertical" and "Double View-Horizontal") reside. Because the custom albums are part of the system PHPhotoLibrary rather than a separate, application-private storage location, any application or system service with appropriate photo library access authorization can query and retrieve the assets they contain. The PHPhotoLibrary (.shared( )) node is the architectural pivot of the three-access-path architecture: all three diverging access paths originate from this single storage source, demonstrating that the single-write operation to custom PHAssetCollection albums simultaneously enables all three access modalities without requiring duplication, export, or synchronization.

Double View APP 1410 represents the originating application itself, which accesses the shared PHPhotoLibrary through its internal GalleryView component. This access pathway is characterized by its application-specific filtering behavior: the GalleryView queries exclusively from the "Double View-Vertical" and "Double View-Horizontal" custom album collections, presenting only the dual-perspective media generated by the application in a purpose-built, filtered browsing environment.

Accessible via <GalleryView> 1415 specifies the access mechanism for the Double View App pathway—the application's dedicated SwiftUI GalleryView component, which fetches assets from the custom PHAssetCollection albums using PHImageManager and renders them in the application's filtered, grouped gallery interface. This access mechanism provides the full organizational capabilities of the dedicated gallery—including media type filtering, grouped entry display, multi-selection mode, and paginated lazy loading—that are not available through the system Photos or third-party application access pathways.

Apple System 1420 represents the iOS operating system's built-in Photos application, which accesses the shared PHPhotoLibrary through its standard system-level interface. Because the custom PHAssetCollection albums are part of the system PHPhotoLibrary, they appear within the Photos application's Albums view alongside the user's personal albums, making the dual-perspective captures browsable and manageable through the operating system's default media management interface.

Accessible via <Photos.app> 1430 specifies the access mechanism for the Apple System pathway—the iOS Photos application (Photos.app), through which the custom albums and their media contents are surfaced in the standard system photo library browsing experience. Media accessed through this pathway is subject to the Photos application's standard capabilities, including editing, sharing, iCloud synchronization, and other system-level media management functions.

External App (e.g., Instagram) 1440 represents any third-party application—with Instagram cited as a representative example—that has been granted PHPhotoLibrary access permission by the device operating system and can therefore retrieve media from the shared photo library, including the application's custom album collections. This component illustrates the broadest class of cross-application accessibility enabled by the single-location custom albums storage architecture.

Accessible via System Picker 1450 specifies the access mechanism for the External App pathway—the system-provided photo picker interface (such as PHPicker ViewController in iOS 14 and later), through which third-party applications present the user with a standard media selection UI that provides access to the full contents of the PHPhotoLibrary, including the application's custom albums. By using the system picker, third-party applications can access the dual-perspective captures without requiring direct PHPhotoLibrary authorization in privacy-sensitive contexts, as the system picker is a privacy-preserving access mechanism that allows users to grant per-selection access to their photo library rather than blanket library access.

Operation on Mobile Devices with Restricted Multi Camera Access (Samsung Implementation)

In certain mobile computing devices, particularly devices manufactured by Samsung Electronics Co., Ltd., hardware abstraction layer (HAL) policies may restrict third party software applications from accessing more than one rear facing camera stream at a time. These restrictions may be enforced regardless of whether the underlying image signal processor and optical hardware are physically capable of producing concurrent image streams from multiple rear sensors.

Although the Android platform provides multiple standardized mechanisms intended to support simultaneous multi camera operation-such as logical multi camera devices and concurrent camera sessions—it has been observed that, on certain Samsung devices, these mechanisms are selectively constrained for non-privileged applications. Such constraints may be implemented at the firmware or HAL level and may operate independently of the application's declared permissions, capture configuration, or requested output formats.

As a result, a software application executing on such devices may be unable to reliably obtain two concurrent rear-facing camera feeds using conventional multi camera APIs, even though the same device may demonstrate dual camera recording capability through first party system camera applications.

The embodiments described in this section address these constraints by enabling the system to dynamically detect restricted multi camera behavior and, in response, to produce the claimed dual orientation media outputs through an alternative capture architecture that does not require concurrent physical access to multiple camera sensors.

Multi-Tier Camera Discovery and Capability Evaluation

In some embodiments, the processor is configured to perform a multi-tier camera discovery procedure to determine an available capture path supported by the executing device. The discovery procedure may be performed during application initialization, prior to enabling a dual perspective capture mode, or dynamically at runtime.

The discovery procedure may include one or more of the following tiers, evaluated sequentially:

Logical Multi Camera Evaluation. The processor may query camera device characteristics to determine whether any camera device advertises a logical multi camera capability. Where such capability is present, the processor may enumerate underlying physical sub cameras, classify them by focal length and sensor characteristics, and attempt to associate distinct physical camera identifiers with respective output surfaces.

Concurrent Camera Session Evaluation. On devices supporting concurrent camera enumeration, the processor may query for advertised sets of camera identifiers that may be opened simultaneously. Where a set containing two rear facing cameras is available, the processor may attempt to initialize two independent camera devices and associate each with a corresponding capture session.

Sequential Probe of Rear Facing Camera Pairs. If the preceding tiers fail to produce a supported configuration, the processor may attempt a controlled sequence of camera pair initialization attempts, testing candidate rear facing camera combinations to identify a permissive pairing. Successful results may be cached locally for reuse on subsequent launches.

Single Camera Fallback Selection. Where none of the above tiers yields a viable multi camera configuration, the processor may select a single rear facing camera for use in generating both claimed output perspectives, as described herein.

This tiered approach allows the system to identify the highest capability capture path permitted by the executing device while ensuring deterministic fallback behavior on devices enforcing multi camera restrictions.

Single Camera Dual Orientation Capture Mode

On devices in which simultaneous access to multiple rear facing cameras is restricted, the processor may operate in a single camera capture mode while still producing both a first media output having a first orientation and a second media output having a second orientation.

Lens Selection. In some embodiments, the processor selects an ultra wide angle rear camera as the single active imaging source. The ultra wide lens may be preferred due to its larger native field of view, which fully encompasses the field of view associated with a standard wide-angle lens on the same device.

Field of View Simulation. The processor may derive two distinct image regions from the image data captured by the single lens: A full field region, representing the native ultra wide perspective; or a cropped region, representing a reduced field of view approximating the perspective of a standard wide angle lens. The cropped region may be determined by applying a digital crop and scale operation to the captured image data. In some implementations, a zoom factor is computed as a ratio between the focal length of a standard lens and the focal length of the selected ultra wide lens. The crop region may be centered on the sensor's active array and scaled to a target resolution corresponding to the desired output orientation.

Simultaneous Preview and Capture. The processor may simultaneously render: a first live preview feed derived from the cropped region and formatted in a first orientation (e.g., portrait); and a second live preview feed derived from the full field region and formatted in a second orientation (e.g., landscape). Both preview feeds may be displayed concurrently within separate, non-overlapping regions of the device display.

Upon receipt of a single user capture command, the processor may encode and store two independent media files—one per orientation—each derived from a respective region of the same captured sensor data. The two media files may be stored concurrently and treated as a paired capture event.

Session Configuration and Surface Management

In some embodiments, the processor configures a single camera capture session with a plurality of output surfaces, including preview surfaces and encoder input surfaces. Depending on device specific HAL behavior, the processor may maintain state variables indicating whether encoder or still capture surfaces are already attached to the active preview session.

Where supported by the device, encoder surfaces may be pre attached to the preview session to enable zero latency recording initiation. On devices requiring stricter session configurations, the processor may dynamically reconfigure the capture session upon initiation of recording or still capture, incurring a one-time reconfiguration latency.

This adaptive session management architecture allows the system to operate efficiently across a range of hardware behavior profiles without requiring device specific hardcoding.

Detection of Restricted Multi Camera Behavior

To determine when to operate in the single camera capture mode, the processor may evaluate one or more restriction detection heuristics, including:

- Manufacturer Based Heuristics. The processor may compare a device manufacturer identifier against a predefined set of manufacturers known to restrict concurrent rear camera access and preemptively select the single camera mode.
  - Runtime Configuration Probing. The processor may attempt a time-bounded multi camera session configuration and detect failure events or configuration timeouts indicative of HAL level restrictions.
  - Output Routing Verification. In cases where multi camera configuration succeeds but physical camera routing is ambiguous, the processor may compare image content from multiple outputs to determine whether both outputs originate from the same physical sensor.

When restricted behavior is detected, the processor may automatically select the single camera dual orientation capture mode without exposing error states or degraded user experience.

Resulting Technical Advantages

By dynamically selecting between a true dual camera implementation and a single camera simulated dual orientation implementation, the system:

- Ensures compatibility with devices that formally expose multiple cameras but restrict third party concurrent access;
- Produces temporally synchronized dual orientation media outputs from a single user action;
- Maintains visual consistency between outputs by deriving both from a single optical pipeline where required; and
- Achieves cross platform robustness without reliance on privileged permissions or manufacturer specific APIs.

These features allow the disclosed system to operate uniformly across Android device ecosystems, including devices imposing firmware level camera access restrictions.

Figure 15:
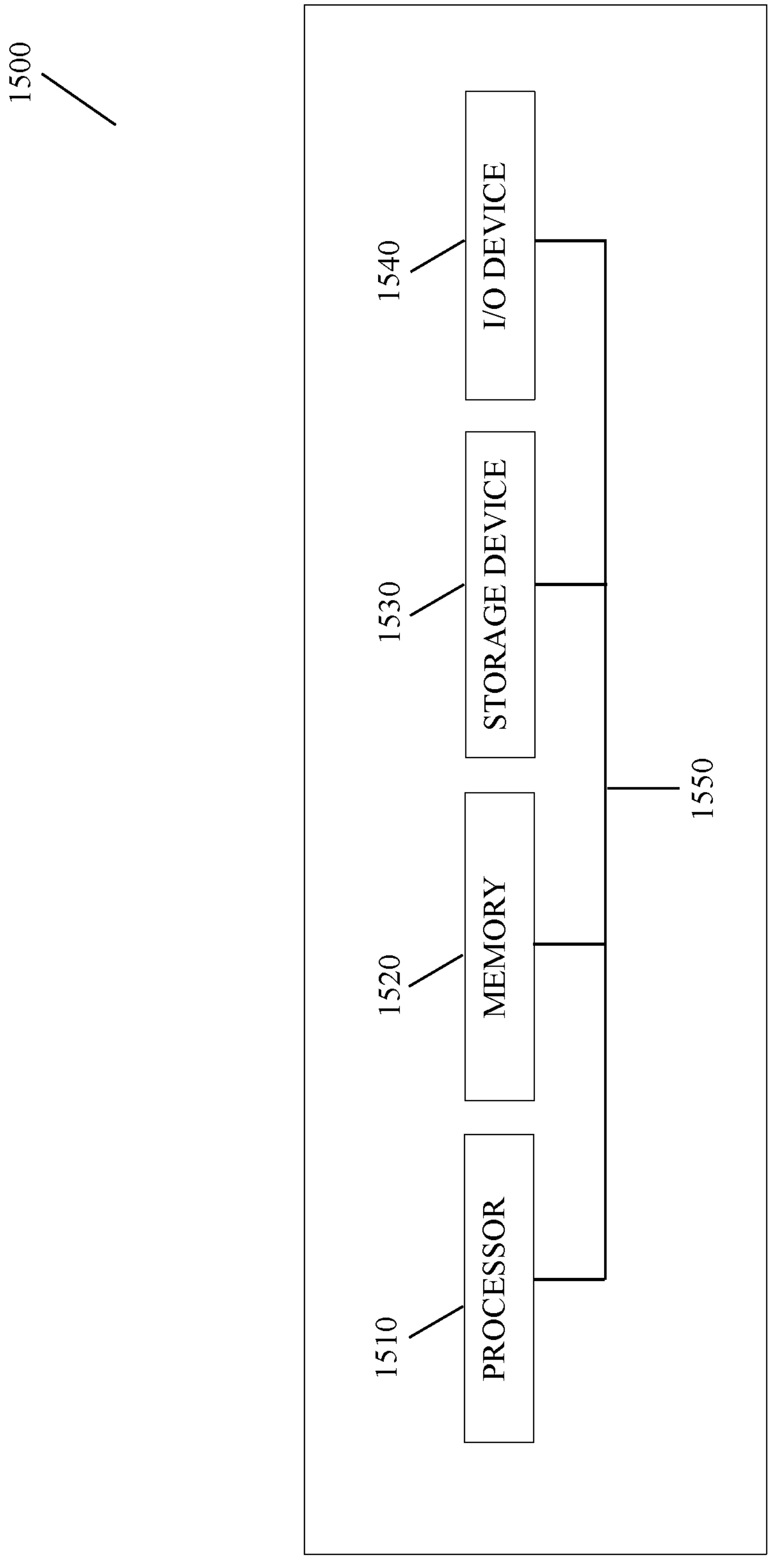

In some implementations, the current subject matter can be configured to be implemented in a system 1500, as shown in FIG. 15. The system 1500 can include a processor 1510, a memory 1520, a storage device 1530, and an input/output device 1540. Each of the components 1510, 1520, 1530 and 1540 can be interconnected using a system bus 1550. The processor 1510 can be configured to process instructions for execution within the system 1500. In some implementations, the processor 1510 can be a single-threaded processor. In alternate implementations, the processor 1510 can be a multi-threaded processor. The processor 1510 can be further configured to process instructions stored in the memory 1520 or on the storage device 1530, including receiving or sending information through the input/output device 1540. The memory 1520 can store information within the system 1500. In some implementations, the memory 1520 can be a computer-readable medium. In alternate implementations, the memory 1520 can be a volatile memory unit. In yet some implementations, the memory 1520 can be a non-volatile memory unit. The storage device 1530 can be capable of providing mass storage for the system 1500. In some implementations, the storage device 1530 can be a computer-readable medium. In alternate implementations, the storage device 1530 can be a floppy disk device, a hard disk device, an optical disk device, a tape device, non-volatile solid state memory, or any other type of storage device. The input/output device 1540 can be configured to provide input/output operations for the system 1500. In some implementations, the input/output device 1540 can include a keyboard and/or pointing device. In alternate implementations, the input/output device 1540 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes both the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the claims that follow rather than by the foregoing description. All variations coming within the meaning and range of equivalency of the claims are embraced within their scope.

What is claimed is:

1. A system comprising:
- a first lens on a mobile device, the first lens having a first viewing angle capable of capturing a subject;
- a second lens on the mobile device, the second lens having a second viewing angle capable of capturing the subject;
- an interactable display on the mobile device; and
- a processor communicatively coupled to the first lens, the second lens, and the interactable display, the processor being configured to:
  - display a first image feed from the first lens in a first region at the interactable display, the first region having a portrait orientation; and
  - display a second image feed from the second lens in a second region at the interactable display, the second region having a landscape orientation,
  - wherein the first image feed and the second image feed are capable of displaying the subject at the interactable display,
  - wherein the first image feed and the second image feed are displayed simultaneously at the interactable display, and
  - wherein the second image feed consists of image data captured exclusively by the second lens and the first image feed consists of image data captured exclusively by the first lens.

2. The system of claim 1, wherein the processor is further configured to:
- match at least one of a color, an exposure, a tonal characteristic, or a white balance of the second image feed to be visually consistent with at least one of a color, an exposure, a tonal characteristic, or a white balance of the first image feed.

3. The system of claim 1, wherein the processor is further configured to:
- capture the first image feed from the first lens in the portrait orientation; and
- capture the second image feed from the second lens in the landscape orientation,
- wherein the capturing of the first image feed and the second image feed is initiated simultaneously.

4. The system of claim 3, wherein the processor is further configured to:
- store the captured first image feed in a first file; and
- store the captured second image feed in a second file,
- wherein the storing of the first image feed and the storing of the second image feed is initiated simultaneously.

5. The system of claim 4, wherein the processor is further configured to:
- match at least one of a color, an exposure, a tonal characteristic, or a white balance of the captured second image feed to be visually consistent with at least one of a color, an exposure, a tonal characteristic, or a white balance of the captured first image feed prior to storing the captured second image feed in the second file.

6. The system of claim 4, wherein the processor is further configured to:
- perform at least one of a cropping operation or a scaling operation of the captured second image feed prior to storing the captured second image feed in the second file.

7. The system of claim 4, wherein the processor is further configured to:
- present the first file having the captured first image feed at the interactable display;
- present the second file having the captured second image feed at the interactable display;
- in response to receiving a first request to identify images in the landscape orientation, present the second file having the captured second image feed at the interactable display without displaying the first file; and
- in response to receiving a second request to identify images in the portrait orientation, present the first file having the captured first image feed at the interactable display without displaying the second file.

8. The system of claim 4, wherein the processor is further configured to:
- in response to receiving a user selection indicating a first aspect ratio compatible with an end application, reformatting at least one of the first file or the second file to have an aspect ratio compatible with the end application.

9. The system of claim 1, further comprising:

a third lens on the mobile device, the third lens having a third viewing angle capable of capturing the subject, wherein the processor is further configured to:

display a third image feed from the third lens in a third region at the interactable display, the third region having a third aspect ratio different than an aspect ratio of the landscape orientation and an aspect ratio of the portrait orientation, wherein the third image feed is capable of displaying the subject at the interactable display, and wherein the first image feed, the second image feed, and the third image feed are displayed simultaneously at the interactable display.

10. The system of claim 1, wherein the processor is further configured to:

perform at least one of a cropping operation or a scaling operation of the second image feed for display at the interactable display.

11. The system of claim 1, wherein a first zoom of the first lens is adjustable using the interactable display, a second zoom of the second lens is adjustable using the interactable display, the first zoom being independently adjustable relative to the second zoom.

12. The system of claim 1, wherein a first zoom of the first lens is adjustable using the interactable display, a second zoom of the second lens is adjustable using the interactable display, and wherein adjusting the first zoom causes a proportional adjustment in the second zoom.

13. The system of claim 1, wherein a first zoom of the first lens is adjustable using the interactable display, a second zoom of the second lens is adjustable using the interactable display, and wherein a logarithmic relationship exists between a user input at the interactable display and the first zoom of the first lens, and wherein the logarithmic relationship exists between the user input at the interactable display and the second zoom of the second lens.

14. The system of claim 1, wherein the first image feed is rendered continuously within the first region and wherein the second image feed is rendered continuously within the second region.

15. The system of claim 1, wherein the second image feed has at least one of a color, an exposure, a tonal characteristic, or a white balance adjusted to be visually consistent with at least one of a color, an exposure, a tonal characteristic, or a white balance of the first image feed.

16. The system of claim 1, wherein the second image feed includes at least one of a plurality of cropped images or a plurality of resized images.

17. A system comprising:

a lens on a mobile device, the lens capable of capturing a subject;

an interactable display at a frontside of the mobile device; and a processor communicatively coupled to the lens and the interactable display, the processor being configured to:

display a first image preview feed from the lens in a first region at the interactable display, the first region having a portrait orientation; and display a second image preview feed from the lens in a second region at the interactable display, the second region having a landscape orientation, wherein the first image preview feed displays the subject within the first region and wherein the second image preview feed displays the subject within the second region, wherein the first region and the second region are displayed at the same time, and wherein no portion of image data of the second image preview feed is shared with the image data of the first image preview feed.

18. The system of claim 17, wherein the processor is further configured to:

format at least one of the first image preview feed or the second image preview feed to have an aspect ratio compatible with an end application in response to receiving a user selection at the interactable display indicating a first aspect ratio compatible with the end application.

19. The system of claim 17, wherein the processor is further configured to:

in response to receiving a user selection at the interactable display indicating a first aspect ratio compatible with a first end application and a second aspect ratio compatible with a second end application, format the first image preview feed to have the first aspect ratio compatible with the first end application; and format the second image preview feed to have the second aspect ratio compatible with the second end application.

20. A system comprising:

a first lens on a mobile device, the first lens having a first viewing angle capable of capturing a subject;

a second lens on the mobile device, the second lens having a second viewing angle capable of capturing the subject;

an interactable display at a frontside of the mobile device; and a processor communicatively coupled to the first lens, the second lens, and the interactable display, the processor being configured to:

display a first image preview feed from the first lens in a first region at the interactable display, the first region having a portrait orientation;

display a second image preview feed from the second lens in a second region at the interactable display, the second region having a landscape orientation;

capture the first image preview feed from the first lens in the portrait orientation;

capture the second image preview feed from the second lens in the landscape orientation;

store the captured first image preview feed in a first video file, the first video file having image data captured exclusively by the first lens; and store the captured second image preview feed in a second video file, the second video file having image data captured exclusively by the second lens, wherein the first video file and the second video file are viewable at a mobile device gallery configured to store video files obtained using at least one other mobile application installed at the mobile device, wherein no portion of the image data stored in the first video file is shared with the image data stored in the second video file.

21. A system comprising:

a first lens on a mobile device, the first lens having a first viewing angle capable of capturing a subject;

a second lens on the mobile device, the second lens having a second viewing angle capable of capturing the subject;

an interactable display on the mobile device; and a processor communicatively coupled to the first lens, the second lens, and the interactable display, the processor being configured to:

display a first image feed from the first lens in a first region at the interactable display, the first region having a portrait orientation; and display a second image feed from the second lens in a second region at the interactable display, the second region having a landscape orientation, wherein the first image feed and the second image feed are capable of displaying the subject at the interactable display, wherein the first image feed and the second image feed are displayed simultaneously at the interactable display, and wherein a first zoom of the first lens is adjustable using the interactable display, a second zoom of the second lens is adjustable using the interactable display, and wherein adjusting the first zoom causes a proportional adjustment in the second zoom such that a ratio between a first field of view and a second field of view is maintained during the adjustment, both the first image feed and the second image feed remaining displayed at the interactable display throughout the adjustment.

22. The system of claim 21, wherein the processor is further configured to:

match at least one of a color, an exposure, a tonal characteristic, or a white balance of the second image feed to be visually consistent with at least one of a color, an exposure, a tonal characteristic, or a white balance of the first image feed.

23. The system of claim 21, wherein the processor is further configured to:

capture the first image feed from the first lens in the portrait orientation; and capture the second image feed from the second lens in the landscape orientation, wherein the capturing of the first image feed and the second image feed is initiated simultaneously.

24. The system of claim 23, wherein the processor is further configured to:

store the captured first image feed in a first file; and store the captured second image feed in a second file, wherein the storing of the first image feed and the storing of the second image feed is initiated simultaneously.

25. The system of claim 24, wherein the processor is further configured to:

match at least one of a color, an exposure, a tonal characteristic, or a white balance of the captured second image feed to be visually consistent with at least one of a color, an exposure, a tonal characteristic, or a white balance of the captured first image feed prior to storing the captured second image feed in the second file.

26. The system of claim 24, wherein the processor is further configured to:

perform at least one of a cropping operation or a scaling operation of the captured second image feed prior to storing the captured second image feed in the second file.

27. The system of claim 24, wherein the processor is further configured to:

present the first file having the captured first image feed at the interactable display;

present the second file having the captured second image feed at the interactable display;

in response to receiving a first request to identify images in the landscape orientation, present the second file having the captured second image feed at the interactable display without displaying the first file; and in response to receiving a second request to identify images in the portrait orientation, present the first file having the captured first image feed at the interactable display without displaying the second file.

28. The system of claim 24, wherein the processor is further configured to:

in response to receiving a user selection indicating a first aspect ratio compatible with an end application, reformatting at least one of the first file or the second file to have an aspect ratio compatible with the end application.

29. The system of claim 21, further comprising:

a third lens on the mobile device, the third lens having a third viewing angle capable of capturing the subject, wherein the processor is further configured to:

display a third image feed from the third lens in a third region at the interactable display, the third region having a third aspect ratio different than an aspect ratio of the landscape orientation and an aspect ratio of the portrait orientation, wherein the third image feed is capable of displaying the subject at the interactable display, and wherein the first image feed, the second image feed, and the third image feed are displayed simultaneously at the interactable display.

30. The system of claim 21, wherein the processor is further configured to:

perform at least one of a cropping operation or a scaling operation of the second image feed for display at the interactable display.

* * * * *